United States Patent [19]

Brunmeier et al.

[11] Patent Number: 5,511,164
[45] Date of Patent: Apr. 23, 1996

[54] METHOD AND APPARATUS FOR DETERMINING THE SOURCE AND NATURE OF AN ERROR WITHIN A COMPUTER SYSTEM

[75] Inventors: Terry J. Brunmeier, Shoreview; Larry L. Byers, Apple Valley; John A. Miller, Shoreview; Gary R. Robeck, Albertville, all of Minn.

[73] Assignee: Unisys Corporation, Blue Bell, Pa.

[21] Appl. No.: 396,952

[22] Filed: Mar. 1, 1995

[51] Int. Cl.⁶ .................................................. C06F 11/00
[52] U.S. Cl. .............................. 395/185.06; 395/182.22; 395/182.13; 395/185.07
[58] Field of Search ............................... 395/575, 185.06, 395/185.07, 185.05, 185.01, 182.22, 182.13, 183.15; 371/51.1, 40.1, 13, 14, 12, 21.3

[56] References Cited

U.S. PATENT DOCUMENTS 3,567,916  3/1971  Fulton, Jr. ................................ 235/153
3,761,695  9/1973  Eichelberger ........................... 235/153

(List continued on next page.)

OTHER PUBLICATIONS

Wilson, Jr., "Hierarchial Cache/Bus Architecture for Shared Memory Multiprocessors", Computer Society Press of the IEEE, 1987, pp. 244–252.
Dubois et al., "Effects of Cache Coherency in Multiprocessors", *IEEE Transactions on Computers*, vol. C–31, No. 11, Nov.351 7 1982, pp. 1083–1099.
Chen, "Error–Correcting Codes with Byte Error–Detection Capability", *IEEE Transactions on Computers*, vol. C–32, No. 7, Jul. 1983, pp. 615–621.
Kaneda, Correspondence, "A Class of Odd–Weight–Column SEC–DED–SbED Codes for Memory System Applications", *IEEE Transactions on Computers*, vol. C–33, No. 8,1 Aug., 1984, pp. 737–789.
Kaunitz et al., "Audit Trail Compaction for Database Recovery", *Communications of the ACM*, vol. 27, No. 7, Jul. 1984, pp. 678–683.
Verhofstad, "Recovery Techniques for Database Systems", *Computing Surveys*, vol. 10, No. 2, Jun. 1978, pp. 167–194.
Blumbergs et al., "High Speed Glitchless Cascade Latch with Set", IBM Technical Disclosure Bulletin, vol. 18, No. 5, Oct. 1975.
Canova et al., "LSSD Compatible D–Function Latch", IBM Technical Disclosure Bulletin, vol. 25, No. 10, Mar. 1983.
Berglund, "Level–Sensitive Scan Design Tests Chips, Boards, System", *Electronics*, vol. 52, No. 6, Mar. 15, 1981, pp. 108–110.
Kuo et al., "Soft–Defect Detection (SDD) Technique for a High–Reliability CMOS SRAM", *IEEE Journal of Solid-State Circuits*, vol. 25, No. 1, Feb. 1990, pp. 61–66.

(List continued on next page.)

*Primary Examiner*—Robert W. Beausoliel, Jr.
*Assistant Examiner*—Joseph E. Palys
*Attorney, Agent, or Firm*—Nawrocki, Rooney & Sivertson

[57] ABSTRACT

A method and apparatus for identify the source and nature of an error, without aborting the operation of the computer system. In one embodiment of the present invention, the source of the error may be a hardware element and the nature of the error may be identified as either fatal or non-fatal. If the nature of the error is considered non-fatal, the present invention may correct the error and continue the operation of the computer system. This may allow detected errors to be handled immediately after they occur, rather than aborting the operation of the computer system and waiting for a support controller or the like to analyze the error. This may significantly enhance the reliability and performance of a corresponding computer system. This may be especially important during time critical operations. Further, since the operation of the computer system may be aborted a fewer number of times, the present invention may minimize the amount of data loss. This may be particularly important for high reliability computer applications, including banking applications and airline reservation applications, where the integrity of the data base is of the utmost importance.

27 Claims, 22 Drawing Sheets

U.S. PATENT DOCUMENTS

| | | | |
|---|---|---|---|
| 3,887,901 | 6/1975 | Moore, III | 340/146.1 |
| 3,911,261 | 10/1975 | Taylor | 325/153 |
| 3,961,747 | 6/1976 | Small et al. | 235/61.9 |
| 3,982,111 | 9/1976 | Lerner et al. | 235/153 |
| 4,016,409 | 4/1977 | Kim | 235/153 |
| 4,040,466 | 4/1977 | Cordi et al. | 340/172.5 |
| 4,056,844 | 11/1977 | Izumi | 364/200 |
| 4,058,851 | 11/1977 | Scheuneman | 364/900 |
| 4,074,229 | 2/1978 | Prey | 340/146.1 |
| 4,084,231 | 4/1978 | Capozzi et al. | 364/200 |
| 4,092,713 | 5/1978 | Scheuneman | 364/200 |
| 4,112,502 | 9/1978 | Scheuneman | 364/900 |
| 4,130,865 | 12/1978 | Heart et al. | 364/200 |
| 4,139,148 | 2/1979 | Scheuneman et al. | 235/312 |
| 4,163,147 | 7/1979 | Scheuneman et al. | 235/312 |
| 4,195,770 | 4/1980 | Benton et al. | 371/21 |
| 4,225,958 | 9/1980 | Funatsu | 371/15 |
| 4,298,929 | 11/1981 | Capozzi | 364/200 |
| 4,298,980 | 11/1981 | Hajdu et al. | 371/25 |
| 4,308,616 | 12/1981 | Timoc | 371/23 |
| 4,349,871 | 9/1982 | Lary | 364/200 |
| 4,369,511 | 1/1983 | Kimura et al. | 371/21 |
| 4,370,746 | 1/1983 | Jones et al. | 371/27 |
| 4,379,344 | 4/1983 | Ozawa et al. | 365/203 |
| 4,393,475 | 7/1983 | Kitagawa et al. | 365/201 |
| 4,399,519 | 8/1983 | Masuda et al. | 365/149 |
| 4,417,328 | 11/1983 | Ochii | 365/203 |
| 4,426,681 | 1/1984 | Bacot et al. | 364/200 |
| 4,433,413 | 2/1984 | Fasang | 371/25 |
| 4,442,487 | 4/1984 | Fletcher et al. | 364/200 |
| 4,476,431 | 10/1984 | Blum | 324/73 R |
| 4,493,077 | 1/1985 | Agrawal et al. | 371/25 |
| 4,513,283 | 4/1985 | Leininger | 340/825.02 |
| 4,525,777 | 6/1985 | Webster et al. | 364/200 |
| 4,531,213 | 7/1985 | Scheuneman | 371/3 |
| 4,534,028 | 8/1985 | Trischler | 371/25 |
| 4,535,455 | 8/1985 | Peterson | 371/13 |
| 4,535,467 | 8/1985 | Davis et al. | 377/81 |
| 4,546,272 | 10/1985 | Suzuki et al. | 307/455 |
| 4,556,974 | 12/1985 | Kozlik | 370/89 |
| 4,566,104 | 1/1986 | Bradshaw et al. | 371/15 |
| 4,580,066 | 4/1986 | Berndt | 307/276 |
| 4,595,911 | 6/1986 | Kregness et al. | 340/347 |
| 4,608,683 | 8/1986 | Shigaki | 370/13 |
| 4,615,030 | 9/1986 | Kumagai | 371/71 |
| 4,628,217 | 12/1986 | Berndt | 307/467 |
| 4,646,229 | 2/1987 | Boyle | 364/200 |
| 4,649,475 | 3/1987 | Scheuneman | 364/200 |
| 4,667,288 | 5/1987 | Keeley et al. | 364/200 |
| 4,670,876 | 6/1987 | Kirk | 371/3 |
| 4,688,219 | 8/1987 | Takamae | 371/10 |
| 4,701,920 | 10/1987 | Resnick et al. | 371/25 |
| 4,715,034 | 12/1987 | Jacobson | 371/21 |
| 4,755,930 | 7/1988 | Wilson, Jr. et al. | 364/200 |
| 4,757,440 | 7/1988 | Scheuneman | 364/200 |
| 4,768,193 | 8/1988 | Takamae | 371/10 |
| 4,782,487 | 11/1988 | Smelser | 371/21 |
| 4,783,785 | 11/1988 | Hanta | 371/25 |
| 4,788,684 | 11/1988 | Kawaguchi et al. | 371/21 |
| 4,794,521 | 12/1988 | Ziegler et al. | 364/200 |
| 4,807,110 | 2/1989 | Pomerene et al. | 364/200 |
| 4,835,458 | 5/1989 | Kim | 324/73 R |
| 4,835,774 | 5/1989 | Ooshima et al. | 371/25 |
| 4,843,542 | 6/1989 | Dashiell et al. | 364/200 |
| 4,847,519 | 7/1989 | Wahl et al. | 307/296.2 |
| 4,853,843 | 8/1989 | Ecklund | 364/200 |
| 4,858,234 | 8/1989 | Hartwell et al. | 371/14 |
| 4,860,192 | 8/1989 | Sachs et al. | 364/200 |
| 4,873,705 | 10/1989 | Johnson | 371/21.2 |
| 4,876,685 | 10/1989 | Rich | 371/21.6 |
| 4,888,772 | 12/1989 | Tanigawa | 371/21.2 |
| 4,896,323 | 1/1990 | Korner et al. | 371/61 |
| 4,897,817 | 1/1990 | Katanosaka | 365/201 |
| 4,903,266 | 2/1990 | Hack | 371/21.2 |
| 4,918,378 | 4/1990 | Katircioglu et al. | 365/210 |
| 4,918,695 | 4/1990 | Scheuneman et al. | 371/51.1 |
| 4,918,696 | 4/1990 | Purdham et al. | 371/57.1 |
| 4,926,426 | 5/1990 | Scheuneman et al. | 371/40.1 |
| 4,962,501 | 10/1990 | Byers et al. | 371/51.1 |
| 4,969,148 | 11/1990 | Nadeau-Dostie et al. | 371/21.1 |
| 4,984,153 | 1/1991 | Kregness et al. | 364/200 |
| 4,992,930 | 2/1991 | Gilfeather et al. | 364/200 |
| 4,993,030 | 2/1991 | Krakhauer et al. | 371/40.1 |
| 4,996,688 | 2/1991 | Byers et al. | 371/16.5 |
| 5,003,542 | 3/1991 | Mashiko et al. | 371/40.1 |
| 5,006,787 | 4/1991 | Katircioglu et al. | 324/73.1 |
| 5,023,776 | 6/1991 | Gregor | 364/200 |
| 5,025,365 | 6/1991 | Mathur et al. | 364/200 |
| 5,025,366 | 6/1991 | Baror | 364/200 |
| 5,032,979 | 7/1991 | Hecht et al. | 364/200 |
| 5,034,923 | 7/1991 | Kuo et al. | 365/189.01 |
| 5,058,006 | 10/1991 | Durdan et al. | 364/200 |
| 5,060,230 | 10/1991 | Arimoto et al. | 371/21.2 |
| 5,072,450 | 12/1991 | Helm et al. | 371/51.1 |
| 5,089,958 | 2/1992 | Horton et al. | 395/575 |
| 5,093,787 | 3/1992 | Simmons | 364/406 |
| 5,107,501 | 4/1992 | Zorian | 371/213 |
| 5,132,937 | 7/1992 | Tuda et al. | 365/201 |
| 5,136,545 | 8/1992 | Takayanagi | 365/203 |
| 5,138,619 | 8/1992 | Fasang et al. | 371/21.1 |
| 5,140,597 | 8/1992 | Araki | 371/51.1 |
| 5,140,685 | 8/1992 | Sipple et al. | 395/425 |
| 5,146,573 | 9/1992 | Sato et al. | 395/425 |
| 5,148,533 | 9/1992 | Joyce et al. | 395/425 |
| 5,155,735 | 10/1992 | Nash et al. | 371/49.1 |
| 5,157,781 | 10/1992 | Harwood et al. | 395/575 |
| 5,166,608 | 11/1992 | Bowles | 324/158 T |
| 5,168,468 | 12/1992 | Magome et al. | 365/200 |
| 5,173,906 | 12/1992 | Dreibelbis et al. | 371/22.5 |
| 5,185,722 | 2/1993 | Ota et al. | 365/201 |
| 5,193,163 | 3/1993 | Sanders et al. | 395/425 |
| 5,195,185 | 3/1993 | Marenin | 395/325 |
| 5,198,758 | 3/1993 | Iknaian et al. | 324/158 R |
| 5,199,034 | 3/1993 | Yeo et al. | 371/21.2 |
| 5,202,969 | 4/1993 | Sato et al. | 395/425 |
| 5,222,066 | 6/1993 | Grula et al. | 371/21.1 |
| 5,222,224 | 6/1993 | Flynn et al. | 395/425 |
| 5,224,101 | 6/1993 | Popyack, Jr. | 371/21.1 |
| 5,228,132 | 7/1993 | Neal et al. | 395/425 |
| 5,241,547 | 8/1993 | Kim | 371/60 |
| 5,255,230 | 10/1993 | Chan et al. | 365/201 |
| 5,255,375 | 10/1993 | Crook et al. | 395/325 |
| 5,258,958 | 11/1993 | Iwahashi et al. | 365/210 |
| 5,267,212 | 11/1993 | Takashima | 371/21.3 |
| 5,274,646 | 12/1993 | Brey et al. | 371/13 |
| 5,293,383 | 3/1994 | Knefel | 371/21.3 |
| 5,299,313 | 3/1994 | Petersen et al. | 395/200 |
| 5,305,261 | 4/1994 | Furutani et al. | 365/189.01 |
| 5,307,484 | 4/1994 | Baker et al. | 395/600 |
| 5,313,602 | 5/1994 | Nakamura | 395/425 |

OTHER PUBLICATIONS

Tsuda, "A Defect and Fault Tolerant Desian of WSI Static RAM Modules", 1990 International Conference on Wafer Scale Integration, pp. 213–219.

Furutani et al., "Built–In Hamming Code ECC Circuit for DRAM's", *IEEE Journal of Solid State Circuits,* vol. 24, No. 1, Feb. 1989, pp. 50–56.

Gray et al., "The Recovery Manager of the System R Database Manager", *Computing Surveys,* vol. 13, No. 2, Jun. 1981.

| SIGNAL | SIGNAL DESCRIPTION |
|---|---|
| D(0-31) | DSD DATA BUS (I.O.Z) - BI-DIRECTIONAL MAIN DATA PATH FOR ALL OPERATIONS - ASSERTED BY BUS MASTER FOR WRITE OPERATIONS AND BY BUS SLAVE FOR READ OPERATIONS |
| DP(0-3) | DSD DATA BUS PARITY (I.O.Z) - DP0 = PARITY FOR D0-7. DP1 = PARITY FOR D8-15. DP2 = PARITY FOR D16-23. DP3 = PARITY FOR D24-31. |
| A(0-29) | DSD ADDRESS BUS (I.O.Z) - BI-DIRECTIONAL ADDRESS BUS FOR ALL DEVICES ATTACHED TO THE INTERFACE - ASSERTED BY THE BUS MASTER. |
| ADS/ | ADDRESS STATUS (I.O.Z) - WHEN ASSERTED BY THE BUS MASTER, THE CONTENTS OF THE ADDRESS BUS ARE VALID - DEFINES THE START OF A BUS CYCLE |
| W-R/ | WRITE/READ (I.O.Z) - INDICATES THE DIRECTION OF DATA TRANSFER RELATIVE TO THE BUS MASTER - DRIVEN BY THE BUS MASTER. WRITE=1, READ=0. |
| HOLD/ | HOLD (O) - ASSERTED BY DEVICE TO INDICATE THAT IT IS REQUESTING BUS MASTERSHIP |
| HLDAI/ | HOLD ACKNOWLEDGE (I) - ASSERTED BY BUS ARBITRATION LOGIC TO INDICATE THAT THE PREVIOUS BUS MASTER HAS RELINQUISHED USE OF THE BUS. |
| BCLK | BUS CLOCK (I) - CLOCK SIGNAL THAT CONTROLS THE DMA PORTION OF THE NCR53C720 |
| RESET/ | CHIP RESET (I) - FORCES A SYNCHRONOUS FULL CHIP RESET OF THE NCR53C720 - MUST BE ASSERTED FOR A MINIMUM OF 15 BUS CYCLES |
| CS/ | CHIP SELECT (I) - SELECTS THE NCR53C720 AS A SLAVE DEVICE - CONNECTED TO ADDRESS BIT 6 IN THE DSD APPLICATION |
| IRQ/ | INTERRUPT (O) - INDICATES THAT SERVICE IS REQUIRED FROM THE USBC |

FIG. 10A

| SIGNAL | SIGNAL DESCRIPTION |
|---|---|
| BE3/ | BYTE ENABLE THREE (I,O,Z) - ENABLES DATA TRANSFER ON DATA BUS LINES D0-D7 - ASSERTED BY BUS MASTER |
| BE2/ | BYTE ENABLE TWO (I,O,Z) - ENABLES DATA TRANSFER ON DATA BUS LINES D8-D15 - ASSERTED BY BUS MASTER |
| BE1/ | BYTE ENABLE ONE (I,O,Z) - ENABLES DATA TRANSFER ON DATA BUS LINES D16-D23 - ASSERTED BY BUS MASTER |
| BE0/ | BYTE ENABLE ZERO (I,O,Z) - ENABLES DATA TRANSFER ON DATA BUS LINES D24-D31 - ASSERTED BY BUS MASTER |
| READYI/ | READY-IN (I) - SIGNAL FROM SLAVE DEVICE TO BUS MASTER INDICATING THAT SLAVE IS READY TO TRANSFER DATA |
| READYO/ | READY-OUT (O) - ASSERTED TO INDICATE THE END OF A SLAVE MODE CYCLE - THE NCR53C720 PROVIDES THIS SIGNAL TO TERMINATE A SLAVE CYCLE |
| MASTER/ | MASTER STATUS (O) - ASSERTED BY THE NCR53C720 WHEN IT BECOMES THE MASTER |
| BS(2-0) | BUS MODE SELECT (I) - SELECTS THE BUS MODE (MOTOROLA OR INTEL) AND ADDRESSING MODE (BIT OR LITTLE ENDIAN) - IN THE DSD APPLICATION, BS(2-0) = "010" THEREBY SELECTING 80386DX LIKE (BUS MODE 4) AND BIG ENDIAN BUS MODE. |
| AUTO/ | SCRIPTS AUTOSTART MODE (I) - SELECTS EITHER AUTO OR MANUAL SCRIPTS START MODE. WHEN AUTO/=0, SCRIPTS STARTS AT ADDRESS-0 (ADDRESS IN DSP REGISTER OF NCR DEVICE) AUTOMATICALLY FOLLOWING A CHIP RESET. WHEN AUTO/=1, SCRIPTS STARTS AFTER THE DSP REGISTER HAS BEEN LOADED BY THE USBC. IN THE DSD APPLICATION, AUTO/ IS SET TO 1. |

FIG. 10B

METHOD AND APPARATUS FOR DETERMINING THE SOURCE AND NATURE OF AN ERROR WITHIN A COMPUTER SYSTEM

CROSS REFERENCE TO CO-PENDING APPLICATIONS

The present application is related to U.S. patent application Ser. No 08/396.951, filed Mar. 1, 1995, entitled "Method and Apparatus For Storing Computer Data After a Power Failure", which is assigned to the assignee of the present invention and is incorporated herein by reference.

BACKGROUND OF THE INVENTION

1. Field of the Invention

The present invention generally relates to general purpose digital data processing systems and more particularly relates to such systems which utilize error detection and correction schemes therein.

2. Description of the Prior Art

A key design element of high reliability computer systems is that of error detection and correction. It has long been recognized that the integrity of the data bits within the computer system is critical to ensure the accuracy of operations performed in the data processing system. The alteration of a single data bit in a data word can dramatically affect arithmetic calculations or can change the meaning of a data word as interpreted by other sub-systems within the computer system.

The cause of an altered data bit may be traced to either a "soft-error" or a "hard error" within a memory element. Soft errors are not permanent in nature and may be caused by alpha particles, electromagnetic radiation, random noise, or other non-destructive events. Soft errors are often referred to as bit-flips indicating that a bit has inadvertently been flipped from a one to a zero or visa versa. Hard errors, on the other hand, are permanent in nature and are often referred to as stuck-at faults. Typically, a hard error may be caused by a manufacturing defect in a memory element or by some other destructive event such as a voltage spike.

One method for performing error detection is to associate an additional bit, called a "parity bit", along with the binary bits comprising a data word. The data word may comprise data, an instruction, an address, etc. Parity involves summing without carry the bits representing a "one" within a data word and providing an additional "parity bit" so that the total number of "ones" across the data word, including the added parity bit, is either odd or even. The term "Even Parity" refers to a parity mechanism which provides an even number of ones across the data word including the parity bit. Similarly, the term "Odd Parity" refers to a parity mechanism which provides an odd number of ones across the data word including the parity bit.

A typical system which uses parity as an error detection mechanism has a parity generation circuit for generating the parity bit. For example, when the system stores a data word into memory, the parity generation circuit generates a parity bit from the data word and the system stores both the data word and the corresponding parity bit into an address location in a memory. When the system reads the address location where the data word is stored, both the data word and the corresponding parity bit are read from the memory. The parity generation circuit then regenerates the parity bit from the data bits read from the memory device and compares the regenerated parity bit with the parity bit that is stored in memory. If the regenerated parity bit and the original parity bit do not compare, an error is detected and the system is notified.

It is readily known that a single parity bit in conjunction with a multiple bit data word can detect a single bit error within the data word. However, it is also readily known that a single parity bit in conjunction with a multiple bit data word can be defeated by multiple errors within the data word. As calculation rates increase, circuit sizes decrease, and voltage levels of internal signals decrease, the likelihood of a multiple errors within a data word increase. Therefore, methods to detect multiple errors within a data word are essential.

System designers have developed methods for detecting multiple errors within multiple bit data words by providing multiple parity bits for each multiple bit data word. Although this technique has been successfully used, it significant increases the overhead required to perform error detection because the parity generation circuit is more complex and the additional parity bits must be stored along with each data word. It can readily be seen that each additional parity bit that is included within a system adds a significant amount of overhead to the system.

Parity generation techniques are also used to perform error correction within a data word. Error correction is typically performed by encoding the data word to provide error correction code bits that are stored along with the bits of the data word. Upon readout, the data bits read from the addressable memory location are again subject to the generation of the same error correction code signal pattern. The newly generated pattern is compared to the error correction code signals stored in memory. If a difference is detected, it is determined that the data word is erroneous. Depending on the encoding system utilized it is possible to identify and correct the bit position in the data word indicated as being incorrect. The system overhead for the utilization of error correction code signals is substantial. The overhead includes the time necessary to generate the error correction codes, the memory cells necessary to store the error correction code bits for each corresponding data word, and the time required to perform the decode when the data word is read from memory. These represent disadvantages to the error correction code system.

Error detection schemes may be used on various internal nodes of a computer system. That is, for high reliability computer systems, many of the data paths within the computer system may have an error detection scheme incorporated therein. However, because of the relatively high overhead cost associated with multiple bit error detection, usually only a limited number of parity bits or the like may be provided. Further, because of the relatively high overhead cost associated with error corrections schemes, only the most critical data paths may utilize such schemes. Finally, because error correction schemes may degrade the performance of a corresponding data path of the computer system, the use of such schemes is often precluded on time critical data paths.

In addition to the above referenced limitations, typical error detection schemes cannot determine the source or nature of an error. Rather, error detection schemes typically only identify that an error exists on a corresponding bus. Under some circumstances, it may be important to identify the underlying hardware element that is the source of the error and also identify the nature of the fault. For example, if an error is detected in a microcode instruction of a computer system, it may be important to determine the hardware source of the error and whether the error is fatal. An error may be considered fatal if the error cannot be corrected without aborting the operation of the computer system. For the example described above, the source of the error may be a memory device and the nature of the error may be a soft error or a hard error. A soft error may be corrected during the operation of the computer system by simply over-writing the correct data to the corrupted memory location, and therefore a soft error may not be deemed to be fatal. However, a hard error within the memory element cannot be corrected without aborting the operation of the computer system and replacing the memory element, and therefore a hard error may be deemed to be a fatal error.

As can be seen, a number of otherwise non-fatal errors may be deemed to be fatal because the source and nature of the error cannot be identified during the operation of the computer system. That is, because none of the prior art error detection schemes provide a mechanism for identifying the source and nature of an error during the operation of the computer system, the system may abort when it would otherwise not be necessary. The use of prior art error detection schemes may, therefore, require a computer system to assume that a non-fatal error to be a fatal error, in order to preserve the integrity of the data base. For example, any error detected in a microcode word may be considered fatal, even if the error is a soft error within a memory wherein the soft error may be corrected by simply writing a correct microcode word to the corrupted memory location. Any further error analysis may be performed by a support controller, but only after the operation of the computer system is aborted. As can readily be seen, this may limit the overall reliability and performance of the corresponding computer system.

SUMMARY OF THE INVENTION

The present invention overcomes many of the disadvantages of the prior art by providing a method and apparatus for identify the source and nature of an error, without aborting the operation of the computer system. In one embodiment of the present invention, the source of the error may be a hardware element and the nature of the error may be identified as either fatal or non-fatal. If the nature of the error is considered non-fatal, the present invention may correct the error and continue the operation of the computer system. This may allow detected errors to be handled immediately after they are detected, rather than aborting the operation of the computer system and waiting for a support controller to analyze the error. This may significantly enhance the reliability and performance of a corresponding computer system, which may be especially important during time critical operations. Further, since the operation of the computer System may be aborted a fewer number of times, the present invention may minimize the amount of data loss. This may be particularly important for high reliability computer applications, including banking applications and airline reservation applications, where the integrity of the data base is of the utmost importance.

In an exemplary embodiment of the present invention, an error detection and test block may be coupled to an address bus and a data bus of a memory element. The memory element may be coupled to a number of users wherein the number of users may write and read data to/from the memory via the address bus and the data bus. The error detection and test block may monitor the data bus during predetermined read operations of the memory element. If an error is detected, the error detection and test block may temporarily interrupt the operation of the computer system and store the corresponding read address. By storing the corresponding read address, the location of the error is identified. Thereafter, the error detection and test block may write and read a number of predetermined test patterns to the read address, and/or a predetermined range of read addresses, thereby determining if the error was caused by a soft error or a hard error.

If the error detection and test block determines that the error was caused by a soft error, the support controller may reload the contents of the memory location which corresponds to the read address, and/or the predetermined range of read addresses. It is also contemplated that the entire contents of the memory may be reloaded, or even all locations on a corresponding card. As stated above, a soft error may be considered non-fatal. Thereafter, the operation of the computer system may be resumed. If the error detection and test block determines that the error was caused by a hard error, the error may be considered fatal and the operation of the computer system may be aborted.

The exemplary embodiment may allow memory parity errors to be handled immediately after they occur, rather than aborting the operation of the computer system and waiting for a support controller to analyze the error. As discussed above, this may significantly enhance the reliability and performance of a corresponding computer system. To further help ensure system reliability, a system may periodically read and/or write each memory location within the memory wherein the present invention may perform error detection thereon. If an error is detected, the present invention may then determine the source and nature of the error as described above.

In another exemplary embodiment of the present invention, an error detection and test block may be used in conjunction with a system which downloads data elements from a cache memory to a disk drive, under limited battery backup power. In the exemplary system, which is described in more detail in the above referenced co-pending patent application which is incorporated reference, a power failure of a primary power source may trigger a download operation of a cache memory. The download operation may be performed under a limited battery backup power source. In such a system, the download operation may be time critical because all of the data elements stored in the cache memory must be downloaded before the limited battery backup power source also fails. A block move instruction may be performed wherein the data may be downloaded from the cache memory, through a data save disk controller, across a DSD bus, through a SCSI controller, and finally to a number of SCSI disk drives. The block move instruction may be controlled by a microsequencer.

An error detection and test block may be coupled to the DSD bus wherein the DSD bus may be coupled to the data save disk controller, the SCSI controller and a memory. Further, the DSD bus may comprise a data bus and an address bus. A microsequencer may be coupled to the data save disk controller, and may request to read instructions and data from the memory via the DSD bus. Further, the data save disk controller and the SCSI controller may read instructions and data from the memory via the DSD bus. Under these circumstances, when a parity error is detected in a data word read from the memory, there may not be enough time to abort the current data transfer and allow a support controller to analyze the error. Because the limited battery backup power source may not have enough power to sustain two full data transfers from the cache memory to the SCSI disk drives, it may be important that the current data transfer not be aborted. It is contemplated, however, that the current data transfer may be stopped, wherein a redundant host interface adapter may continue the current system transfers.

The error detection and test block may allow the source and nature of the error to be determined without the need to abort current system data transfers. If the nature of the error is non-fatal, the error may be corrected and the current system transfer may continue. However, if the nature of the error is determined to be fatal, the current system transfer may be aborted, and the data may be lost.

This embodiment may operate substantially the same as the previously described embodiments. That is, the error detection and test block may monitor the data bus of the memory during predetermined read operations. If an error is detected, the error detection and test block may temporarily interrupt the data transfer and may store the corresponding read address. By storing the corresponding read address, the location of the error is identified. Thereafter, the error detection and test block may write and read a number of predetermined test patterns to the read address, and/or a predetermined range of read addresses, thereby determining if the error was caused by a soft error or a hard error. If the error detection and test block determines that the error was caused by a soft error, the support controller may reload the contents of the memory location which corresponds to the read address, and/or the predetermined range of read addresses, and the operation of the computer system may be resumed. It is contemplated that the support controller may reload the entire memory or even all memory on a corresponding card. As stated above, a soft error may be considered non-fatal. If the error detection and test block determines that the error was caused by a hard error, the error may be considered fatal and the data transfer may be aborted. This may allow memory parity errors to be handled immediately after they occur, rather than aborting the data transfer and waiting for a support controller to analyze the error. As discussed above, this may significantly enhance the reliability and performance of a corresponding computer system. To further help ensure system reliability, the corresponding computer system may periodically read and/or write each memory location within the memory wherein the present invention may perform error detection thereon. If an error is detected, the present invention may then determine the source and nature of the error as described above.

While the above reference embodiments refer to a memory element, it is contemplated that the present invention may be equally applicable to other hardware elements including gates, processors, busses, I/O buffers, etc. That is, the present invention may isolate the source of an error and may further determine the nature of the error, while not requiring the operation of the computer system to be aborted. These alternative embodiments are also deemed to be within the scope of the present invention.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIGS. 10A–10B comprise a table illustrating an exemplary bus description of the DSD bus of FIG. 8;

DETAILED DESCRIPTION OF THE PREFERRED EMBODIMENTS

Figure 1:
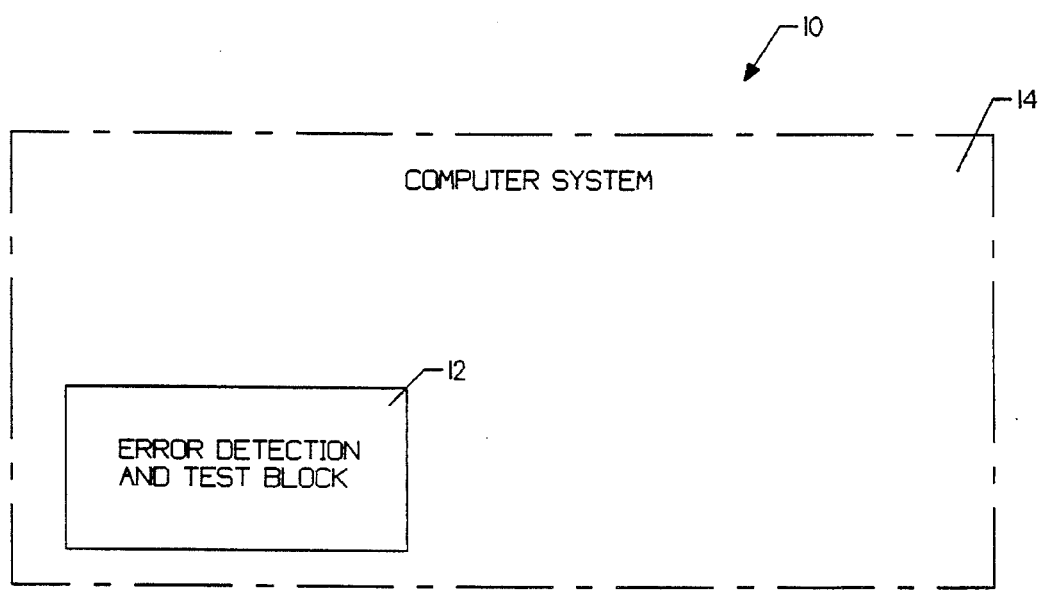
FIG. 1 is a block diagram of an exemplary computer system incorporating an error detection and test block in accordance with the present invention.

FIG. 1 is a block diagram of an exemplary computer system incorporating an error detection and test block in accordance with the present invention. The block diagram is generally shown at 10. A computer system 14 may have an error detection and test block 12 therein. Error detection and test block 12 may identify the source and nature of an error within computer system 14, without aborting the operation of computer system 14. In one embodiment of the present invention, the source of the error may be a hardware element within computer system 14, and the nature of the error may be identified as either fatal or non-fatal. If the nature of the error is considered non-fatal, the exemplary embodiment may correct the error and continue the operation of computer system 14. This may allow detected errors to be handled immediately after they occur, rather than having to abort the operation of computer system 14, and wait for a support controller (not shown) or the like to analyze the error. This may significantly enhance the reliability and performance of computer system 14, which may be especially important during time critical operations. Further, since the operation of computer system 14 may be aborted a fewer number of times, the exemplary embodiment may minimize the amount of data loss. This may be particularly important for high reliability computer applications, including banking applications and airline reservation applications, where the integrity of the data base is of the utmost importance.

Figure 2:
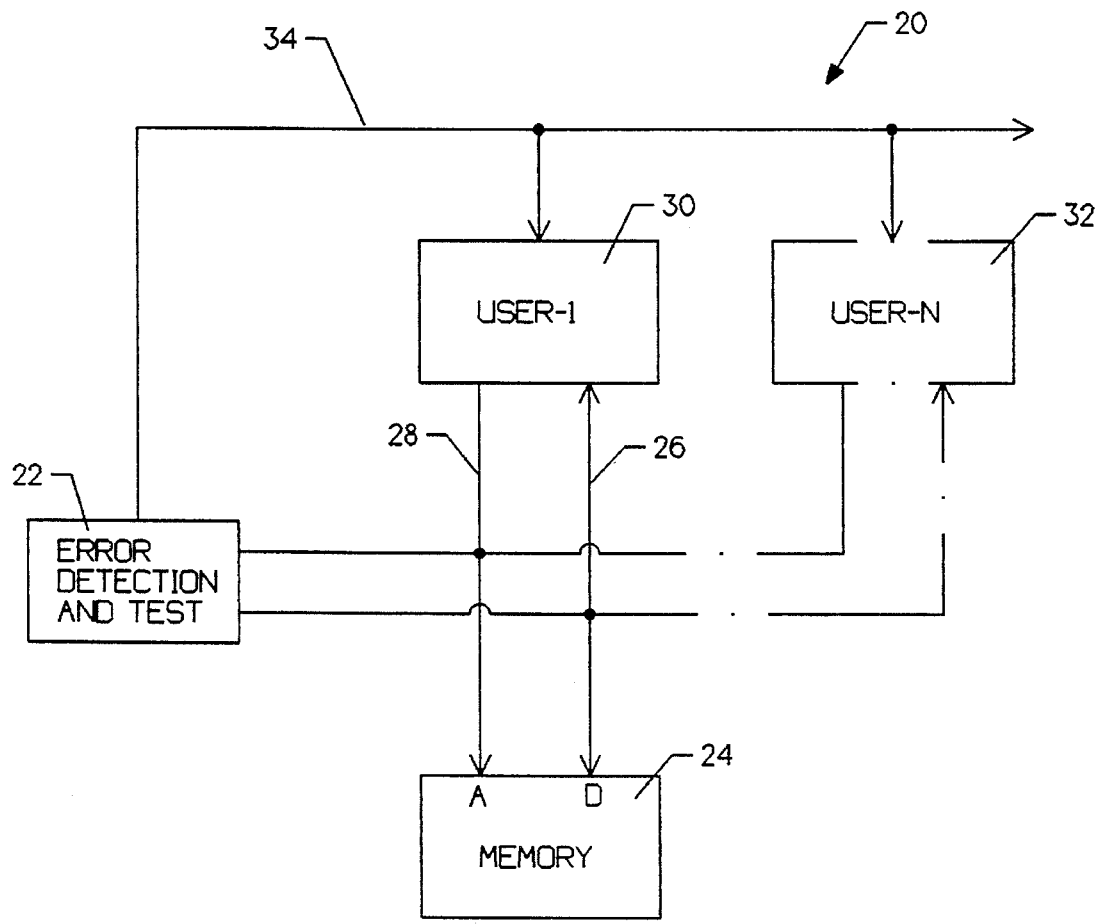
FIG. 2 is a block diagram of another exemplary computer system incorporating an error detection and test block in accordance with the present invention.

FIG. 2 is a block diagram of another exemplary computer system incorporating an error detection and test block in accordance with the present invention. The block diagram is generally shown at 20. In the exemplary embodiment, an error detection and test block 22 may be coupled to an address bus 28 and a data bus 26. Address bus 28 and data bus 26 may be coupled to a memory 24 and a number of users 30,32 and may provide an interface therebetween. Although only a first user 30 and an Nth user 32 are shown, it is contemplated that any number of users may be provided. Further, the number of users 30,32 may comprise instruction processors, microsequencers, or any other device which may be coupled to a memory. The number of users 30,32 may write and read data to/from memory 24 via address bus 28 and data bus 26. Error detection and test block 22 may monitor data bus 26 during predetermined read operations of memory element 24. If an error is detected, error detection and test block 22 may temporarily interrupt the operation of the number of users via interface 34, and store the corresponding read address for analysis. By storing the corresponding read address, the location of the error may be identified. Thereafter, error detection and test block 22 may write and read a number of predetermined test patterns to the read address of memory 24 via address bus 28 and data bus 26, thereby determining if the error was caused by a soft error or a hard error. It is further contemplated that the number of predetermined test patterns may be read and written to a predetermined range of read addresses to help isolate the cause of the error. In the exemplary embodiment, if the same error exists after writing and reading a number of test patterns to the "bad" read address of memory 24, the error is assumed to be a hard error.

If error detection and test block 22 determines that the error was caused by a soft error within memory 24, error detection and test block 22 may reload the contents of memory 24. It is also contemplated that a support controller or the like (not shown) may perform the reload function. In an exemplary embodiment, error detection and test block 22 may only reload the "bad" read address location, and/or the predetermined range of read addresses, rather than the entire contents of memory 24. As stated above, a soft error may be considered non-fatal. Thereafter, the operation of the number of users 30,32 may be resumed via interface 34. If error detection and test block 22 determines that the error was caused by a hard error, the error may be considered fatal and the operation of the number of users 30,32 may be aborted via interface 34.

The exemplary embodiment may allow errors detected in memory 24 to be handled immediately after they are detected, rather than aborting the operation of the number of users 30,32 and waiting for a support controller (not shown) to analyze the error. As discussed above, this may significantly enhance the reliability and performance of a corresponding computer system. To further help ensure system reliability, a system (not shown) may periodically read and/or write each memory location within the memory wherein the present invention may perform error detection thereon. If an error is detected, the present invention may then determine the source and nature of the error as described above.

Figure 3:
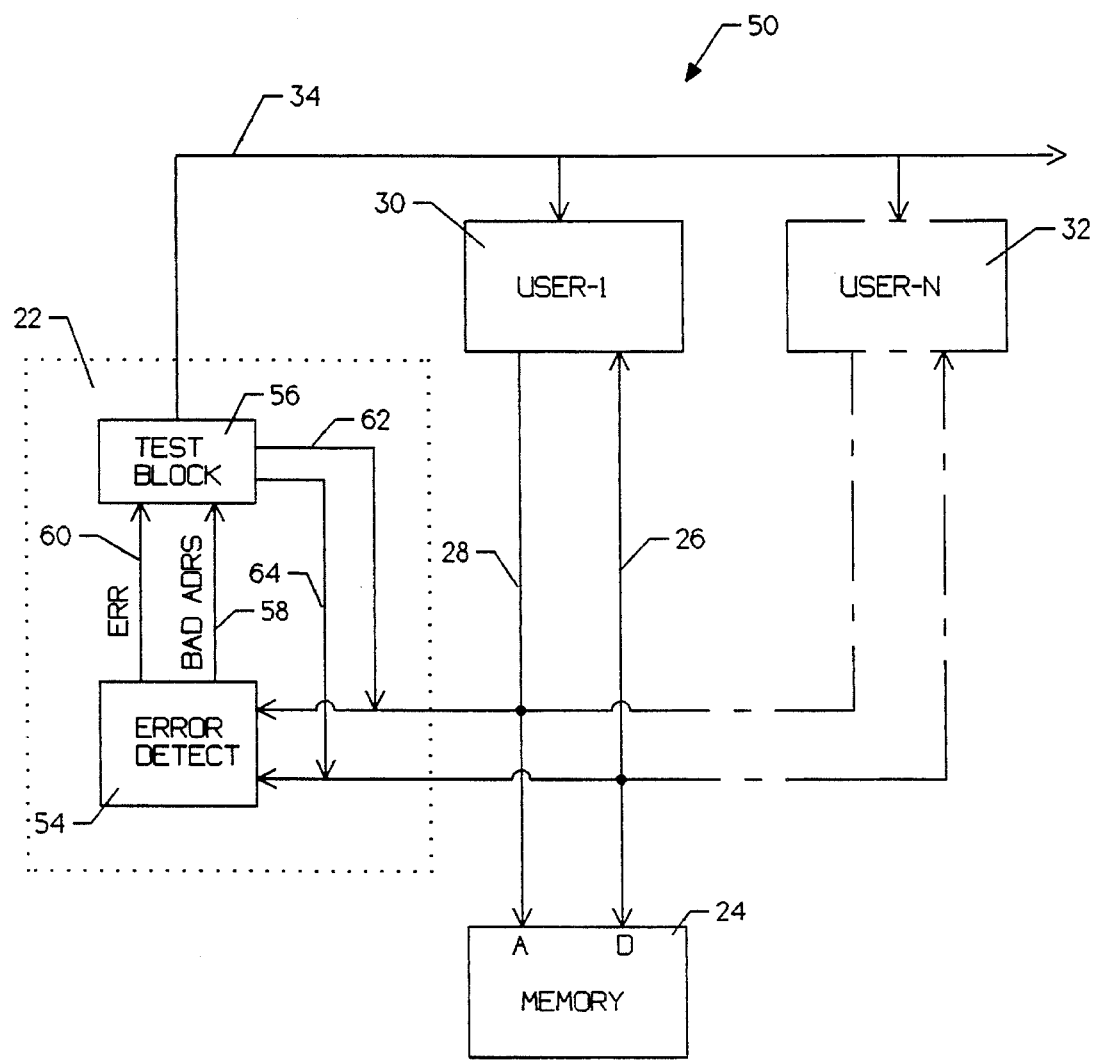
FIG. 3 is a block diagram of the exemplary computer system of FIG. 2, showing an exemplary implementation of the error detection and test block.

FIG. 3 is a block diagram of the exemplary computer system of FIG. 2, showing an exemplary implementation of the error detection and test block. Error detection and test block 22 may comprise an error detect block 54 and a test block 56. Error detect block 54 may be coupled to address bus 28 and data bus 26. Error detect block 54 may monitor data provided to data bus 26 and detect any errors thereon. In an exemplary embodiment, error detect block 54 may monitor all read operations performed by the number of users 30,32 on memory 24. When an error is detected on data bus 26, error detect block 54 may store the read address which is present on address bus 28. In this way, the location of the error within memory 24 may be identified. That is, the particular address location within memory 24 which produced the fault on data bus 26 may be identified. Error detect block 54 may then provide the "bad" read address and an error signal to test block 56 via interfaces 58 and 60, respectively.

Test block 56 may write and read a number of predetermined test patterns to the "bad" read address of memory 24, via interfaces 62 and 64. It is further contemplated that test block 56 may write and read the number of predetermined test patterns to a predetermined range of read addresses to help isolate the error. Interfaces 62 and 64 may be coupled to data bus 26 and address bus 28, respectively. By writing and reading a number of predetermined test patterns to the "bad" read address of memory 24, test block 56 may determine if the error was caused by a soft error or a hard error. The predetermined patterns may include a parity pattern, a checkerboard pattern, an all zeros pattern, an all ones pattern, etc., or any combination thereof. In the exemplary embodiment, if the same error exists after writing and reading a number of test patterns to the "bad" read address of memory 24, the error is assumed to be a hard error.

If test block 56 determines that the error was caused by a soft error within memory 24, test block 56 may reload the contents of memory 24 via interfaces 62 and 64. It is contemplated that a support controller or the like (not shown) may perform the reload function. In an exemplary embodiment, test block 56 may only reload the "bad" read address location, and/or the predetermined range of read addresses, rather than the entire contents of memory 24. It is contemplated, however, that the entire contents of memory 24 may be reloaded, or even all devices on a corresponding card. As stated above, a soft error may be considered non-fatal. Thus, test block 54 may enable the number of users 30,32 to resume operation via interface 34. If test block 56, however, determines that the error was caused by a hard error, the error may be considered fatal and the test block 56 may abort the operation of the number of users 30,32 via interface 34.

The exemplary embodiment may allow errors detected in memory 24 to be handled immediately after they are detected, rather than aborting the operation of the number of users 30,32 and waiting for a support controller (not shown) to analyze the error. As discussed above, this may significantly enhance the reliability and performance of a corresponding computer system. To further help ensure system reliability, a system (not shown) may periodically read and/or write each memory location within the memory wherein the present invention may perform error detection thereon. If an error is detected, the present invention may then determine the source and nature of the error as described above.

Figure 4:
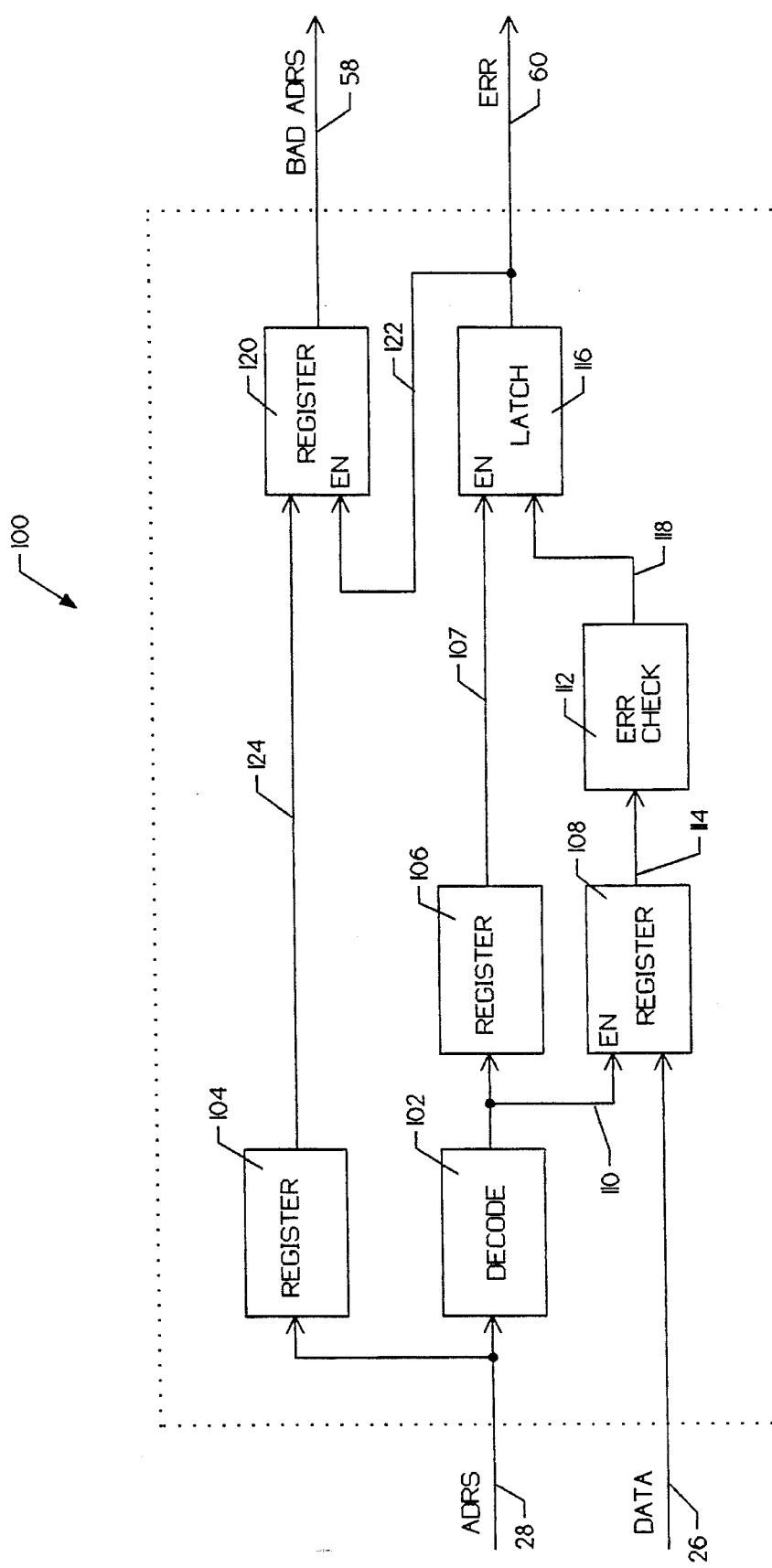
FIG. 4 is a schematic diagram of an exemplary implementation of the error detect block of FIG. 3.

FIG. 4 is a schematic diagram of an exemplary implementation of the error detect block of FIG. 3. The schematic diagram is generally shown at 100. The error detect block of FIG. 3 is generally shown at 54. As indicated above, error detect block 54 may be coupled to address bus 28 and data bus 26. Error detect block 54 may monitor data words provided to data bus 26 and detect any errors therein. In an exemplary embodiment, error detect block 54 may monitor all read operations performed by the number of users 30,32 on memory 24. When an error is detected on data bus 26, error detect block 54 may store the corresponding read address which is present on address bus 28. In this way, the location of the error within memory 24 may be identified. That is, the particular address location within memory 24 which produced the error may be identified. Error detect block 54 may then provide the "bad" read address and an error signal to test block 56 via interfaces 58 and 60, respectively.

In the exemplary embodiment, a decoder 102 may be coupled to address bus 28. Decoder 102 may monitor address bus 28 and determine if a read operation is being performed on memory 24. In an exemplary embodiment, address bus 28 may comprise a number of bits which may indicating if a read operation is being performed on memory 24. For example, referring to FIG. 11, slave select bits 972 may indicate if memory 24 is currently being accessed. Further, R/W field 970 may indicate if a read operation or a write operation is being performed thereon. Decoder 102 may decode these bits and assert interface 110 when a read operation of memory 24 is being performed. During each bus cycle, the corresponding address on address bus 28 may be latched into a register 104.

A register 108 may be coupled to data bus 26. Register 108 may be enabled by decoder 102 via interface 110. As indicated above, interface 110 may be asserted by decoder 102 when a read operation is being performed on memory 24. Register 108 may store the corresponding data word on data bus 26 whenever a read operation is being performed on memory 24. Similarly, a register 106 may latch the output of decoder 102, thereby enabling latch 116 via interface 107. That is, when decoder 102 detects a read operation of memory 24, register 106 stores the value on interface 110, thereby causing latch 116 to go transparent. Meanwhile, register 108 provides the corresponding data word to parity check block 112 via interface 114. Parity check block 112 may check the parity of the data word. Although a parity error detection technique is used in the exemplary embodiment, it is contemplated that any other error detection means may be used. If an error is detected by parity check block 112, an error signal may be provided to latch 116 via interface 118. Since register 106 has asserted the enable input of latch 116 via interface 107, latch 116 is transparent and the error signal may be provided to error line 60.

The error signal may also be provided to an enable input of a register 120 via interface 122. Register 120 may be coupled to register 104. When an error signal is provided to the enable input of register 120, the corresponding address stored in register 104 may be latched into register 120. That is, the corresponding address location of memory 24 may be latched into register 120 when an error is detected during a read operation of memory 24. The corresponding "bad" address may be provided to test block 56 via interface 58.

If a read operation is not detected by decoder 102, interface 110 is not asserted and the corresponding data word is not latched into register 108. Further, latch 116 is not enabled thereby prohibiting the output of parity check block 118 from reaching interface 60.

Figure 5:
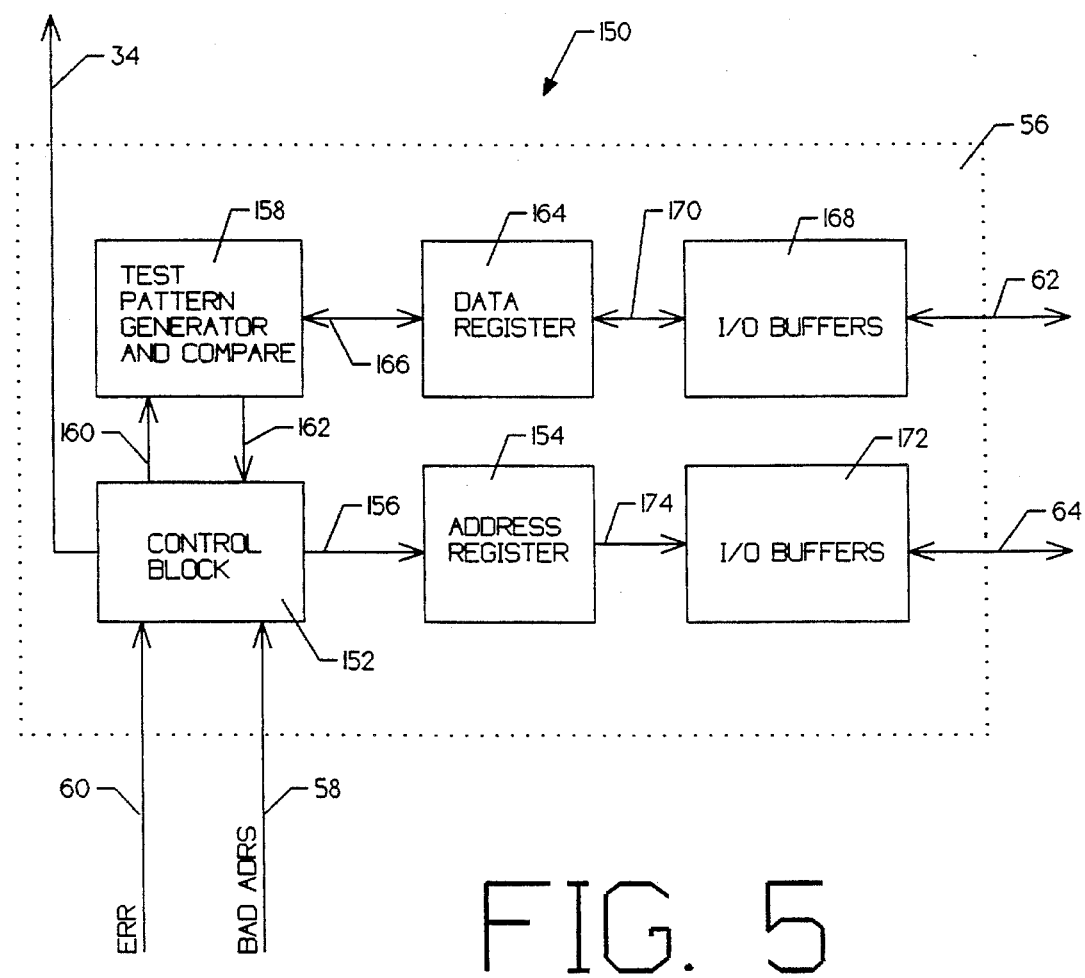
FIG. 5 is a block diagram of an exemplary implementation of the test block of FIG. 3.

FIG. 5 is a block diagram of an exemplary implementation of the test block of FIG. 3. The block diagram is generally shown at 150. The test block of FIG. 3 is generally shown at 56. As indicated above, test block 56 may write and read a number of predetermined test patterns to the "bad" read address of memory 24, via interfaces 62 and 64. Interfaces 62 and 64 may be coupled to data bus 26 and address bus 28, respectively. By writing and reading a number of predetermined test patterns to the "bad" read address of memory 24, test block 56 may determine if the error was caused by a soft error or a hard error. As stated above, it is further contemplated that a predetermined range of read addresses may be written and read as described above. This may help isolate the cause of the error. The predetermined patterns may include a parity pattern, a checkerboard pattern, an all zeros pattern, an all ones pattern, etc., or any combination thereof. In the exemplary embodiment, if the same error exists after writing and reading a number of test patterns to the "bad" read address of memory 24, the error is assumed to be a hard error.

If test block 56 determines that the error was caused by a soft error within memory 24, test block 56 may reload the contents of memory 24 via interfaces 62 and 64. It is also contemplated that a support controller or the like (not shown) may reload the contents of memory 24. In an exemplary embodiment, test block 56 may only reload the "bad" read address location, rather than the entire contents of memory 24. However, it is contemplated that the entire contents of memory 24 may be reloaded, or even all devices on a corresponding card. As stated above, a soft error may be considered non-fatal. Thus, test block 54 may enable the number of users 30,32 to resume operation via interface 34. If test block 56, however, determines that the error was caused by a hard error, the error may be considered fatal and test block 56 may abort the operation of the number of users 30,32 via interface 34.

The exemplary embodiment may allow errors detected in memory 24 to be handled immediately after they are detected, rather than aborting the operation of the number of users 30,32 and waiting for a support controller (not shown) to analyze the error. As discussed above, this may significantly enhance the reliability and performance of a corresponding computer system.

Referring specifically to FIG. 5, test block 56 may have a control block 152, a test pattern generator block 158, a data register 164, an address register block 154, a data I/O buffer block 168, and an address I/O buffer block 172. Control block 152 may receive the "bad" address and an error signal from error detect block 54 via interfaces 58 and 60, respectively (see FIG. 4). Control block 152 may temporarily interrupt the operation of the number of users 30,32 via interface 34. Control block 152 may further initiate a test sequence of the "bad" address location by providing the "bad" address to test pattern generator block 158. Further, control block 152 may provide the "bad" address to address register 154 via interface 156.

Test pattern generator block may perform a number of read and write operations to the "bad" address. For a write operation, test pattern generator block 158 may notify control block 152 that a write operation of memory 24 is desired, via interface 162. Control block 152 may then provide the "bad" address along with the necessary control bits to complete the requested read operation. For example, and referring to FIG. 11, control block 152 may provide the appropriate slave select bits 972 and may further provide the appropriate R/W bit 970 to affect the desired write operation.

Test pattern generator block 258 may then provide a data word to data register 164 via interface 166. The data word, the address, and the appropriate control signals may be provided to data bus 26 and address bus 28 via I/O buffer blocks 168 and 172. Memory 24 may then write the data word to the corresponding "bad" address location.

Test pattern generator block 158 may then perform a read operation of the "bad" address. For a read operation, test pattern generator block 158 may notify control block 152 that a read Operation of memory 24 is desired. Control block 152 may then provide the "bad" address along with the necessary control bits to complete the requested read operation. For example, and referring to FIG. 11, control block 152 may provide the appropriate slave select bits 972 and may further provide the appropriate R/W bit 970 to affect the desired read operation.

Memory 24 may then read the data word from the corresponding "bad" address location. Memory 24 may provide the read data word to data register 164 via I/O buffer block 168. Register 164 may then provide the read data word to test pattern generator block 158 via interface 166. Thereafter, test pattern generator block 158 may then compare the data word that was written to the "bad" address of memory 24 with the data word that was read from the "bad" address of memory 24. In the exemplary embodiment, if the same error exists after writing and reading a data word to the "bad" read address of memory 24, the error is assumed to be a hard error.

Test pattern generator block 158 may write and read a number of test patterns to the "bad" address of memory 24. By writing and reading a number of predetermined test patterns to the "bad" read address of memory 24, test pattern generator block 158 may determine if the error was caused by a soft error or a hard error. The predetermined patterns may include a parity pattern, a checkerboard pattern, an all zeros pattern, an all ones pattern, etc., or any combination thereof.

If test pattern generator block 158 determines that the error was caused by a soft error, test pattern generator block 158 may reload the contents of memory 24 via interfaces 62 and 64, as described above. It is contemplated that a support controller or the like (not shown) may perform the reload function rather than test pattern generator block 158. In an exemplary embodiment, test pattern generator block 158 may only reload the "bad" read address location, rather than the entire contents of memory 24. However, it is contemplated that the entire contents of memory 24 may be reloaded, or even all devices on a corresponding card. As stated above, a soft error may be considered non-fatal. Thus, control block 152 may enable the number of users 30,32 to resume operation via interface 34. If test pattern generator 158, however, determines that the error was caused by a hard error, the error may be considered fatal and control block 152 may abort the operation of the number of users 30,32 via interface 34.

The exemplary embodiment may allow errors detected in memory 24 to be handled immediately after they are detected, rather than aborting the operation of the number of users 30,32 and waiting for a support controller (not shown) to analyze the error. As discussed above, this may significantly enhance the reliability and performance of a corresponding computer system. To further help ensure system reliability, a system (not shown) may periodically read and/or write each memory location within the memory wherein the present invention may perform error detection thereon. If an error is detected, the present invention may then determine the source and nature of the error as described above.

Figure 6:
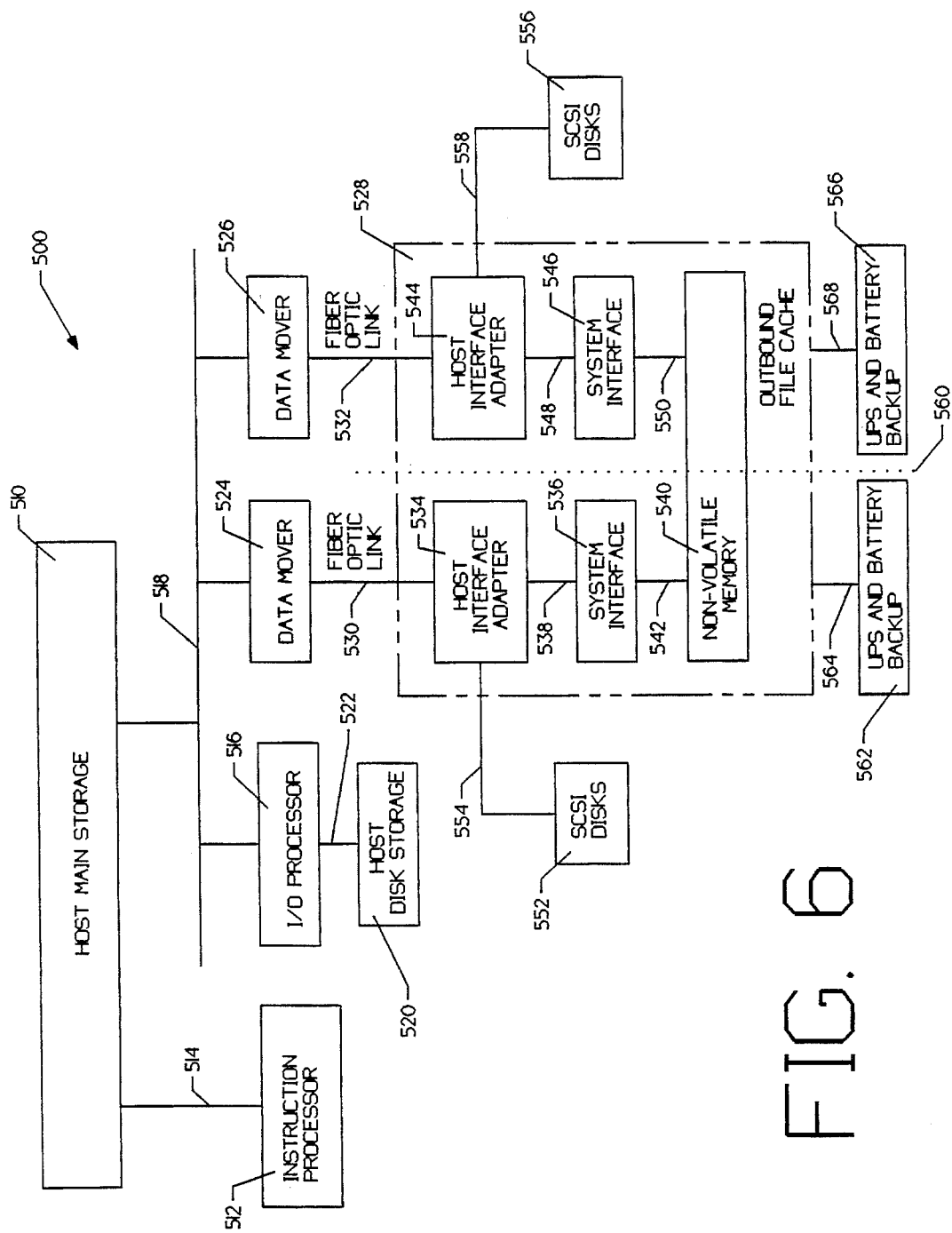
FIG. 6 is a block diagram of an exemplary computer system which may incorporate the present invention.

FIG. 6 is a block diagram of an exemplary computer system which may incorporate the present invention. The block diagram is generally shown at 500. The XPC comprises an instruction processor 512, an IO processor 516, a host disk storage 520, an outbound File Cache block 528, and a host main storage 510. Instruction processor 512 receives instructions from host main storage 510 via interface 514. Host main storage 510 is also coupled to MBUS 518. I/O processor 516 is coupled to MBUS 518 and is further coupled to host disk storage 520 via interface 522. In the exemplary embodiment, outbound File Cache block 528 is coupled to MBUS 518 through a first data mover 524 and a second data mover 526. Outbound File Cache block 528 may comprise two separate power domains including a power domain-A powered by a universal power source (UPS) and battery backup power source 562 via interface 564, and a power domain-B powered by a UPS power source and battery backup power source 566 via interface 568. The separation of power domain-A and power domain-B is indicated by line 560. UPS and battery backup blocks 562 and 566 may have a detection means therein to detect when a corresponding primary power source fails or becomes otherwise degraded.

Power domain-A of outbound file cache 528 may comprise a host interface adapter 534, a system interface block 536, and a portion of a nonvolatile memory 540. Host interface adapter 534 may be coupled to data mover 524 via fiber optic link 530 and may further be coupled to system interface block 536 via interface 538. System interface block 536 may be coupled to nonvolatile memory 540 via interface 542, as described above. Similarly, host interface adapter 544 may be coupled to data mover 526 via fiber optic link 532 and may further be coupled to system interface block 546 via interface 548. System interface block 546 may be coupled to nonvolatile memory 540 via interface 550, as described above.

The data may be transferred from the host disk storage 520 through I/O processor 516 to host main storage 510. But now, any updates that occur in the data are stored in nonvolatile memory 540 instead of host disk storage 520, at least momentarily. All future references then access the data in nonvolatile memory 540. Therefore, nonvolatile memory 540 acts like a cache for host disk storage 520 and may significantly increases data access speed. Only after the data is no longer needed by the system is it transferred back to host disk storage 520. Data movers 524 and 526 are used to transmit data from the host main storage 510 to the nonvolatile memory 540 and vice versa. In the exemplary embodiment, data movers 524 and 526 perform identical cache functions thereby increasing the reliability of the overall system. A more detailed discussion of the XPC system may be found in the above reference co-pending application, which has been incorporated herein by reference.

In accordance with the present invention, a data save disk system 552 may be coupled to host interface adapter 534 via interface 554. Similarly, data save disk system 556 may be coupled to host interface adapter 544 via interface 558. Data save disk systems 552 and 556 may comprise SCSI type disk drives and host interface adapters 534 and 544, respectively, may provide a SCSI interface thereto. In this configuration, the data elements stored in nonvolatile memory 540 may be downloaded directly to the data save disk systems 552 and 556. This may permit computer system 500 to detect a power failure in a power domain, switch to a corresponding backup power source 562 or 566, and store all of the critical data elements stored in nonvolatile memory 540 on SCSI disk drives 552 or 556 before the corresponding backup power source 562 or 566 also fails.

The primary power sources may comprise a universal power source (UPS) available from the assignee of the present invention. The backup power sources may comprise a limited power source, like a battery. Typical batteries may provide power to a computer system for only a limited time. For some computer systems, a large battery or multiple batteries may be required to supply the necessary power. Further, because the power requirements of some computer systems are substantial, the duration of the battery source may be very limited. It is therefore essential that the critical data elements be downloaded to a corresponding data save disk system 552 or 556 as expediently as possible.

In the exemplary embodiment, backup power source 562 may only power a first portion of nonvolatile memory 540, host interface adapter 534, system interface 536, and data save disk system 552. Similarly, backup power source 566 may only power a second portion of nonvolatile memory 540, host interface adapter 544, system interface 546, and data save disk system 556. In this configuration, the remainder of computer system 500, including instruction processor 512, I/O processor 516, host main storage 510, and host disk storage 520, may not be powered after the primary power source fails. This may allow backup power sources 562 and 566 to remain active for a significantly longer period of time thereby allowing more data to be downloaded from nonvolatile memory 540. In this embodiment, host interface adapters 534 and 544 may have circuitry to support the downloading of the critical data elements to the SCSI disk drives 552 and 556, without requiring any intervention by instruction processor 512 or I/O processor 516.

Coupling data save disk systems 552 and 556 directly to host interface adapters 534 and 544, respectively, rather than to instruction processor 512 or I/O processor 516 may have significant advantages. As indicated above, it may be faster to download the data elements directly from nonvolatile memory 540 to data save disk systems 552 or 556, rather than providing all of the data to I/O processor 516 and then to host disk storage 520. Further, significant power savings may be realized by powering only the blocks in outbound file cache 528 and the corresponding data save disk systems 552 or 556, thereby allowing more data to be downloaded before a corresponding backup power source 562 or 566 fails. Finally, data save disk systems 552 and 556 may be dedicated to storing the data elements in nonvolatile memory 540 and thus may be appropriately sized.

In a preferred mode, once the data save operation has begun, it continues until all of the data in nonvolatile memory 540 has been transferred to the data save disk system. Thereafter, the data save disks are spun down and the outbound file cache 528 is powered down to minimize further drain on the battery backup power source. If the primary power source comes back on during the data save operation, the data save is still completed, but the outbound file cache 528 is not powered down. When primary power is restored, the operation of computer system 500 may be resumed beginning with a data restore operation, but only after the battery backup power source has been recharged to a level which could sustain another primary power source failure.

The data restore operation occurs after normal computer system 500 initialization, including power-up, firmware load, etc. However, before a data restore operation is allowed to begin, the presence of saved data on a corresponding data save disk must be detected. Prior to initiating the data restore operation, the USBC microcode (see FIG. 7) compares the present computer system 500 configuration with the configuration that was present when the data save operation was executed. If the two configurations are not an exact match, the data restore operation is not executed and an error is indicated.

A data save disk set may be added to the outbound file cache 528 as a single or redundant configuration. A single data save set may save one copy of the nonvolatile memory 540 contents, and is used when there is only one Universal Power Source (UPS) 562 driving the outbound file cache 528 and data save disks. A redundant data save disk configuration may have two data save disk sets (as shown in FIG. 6) and may save two copies of the nonvolatile memory contents. In the redundant configuration, one set of data save disk drives may be powered from one UPS while the another set of data save disk drives may be powered by another UPS.

Figure 7:
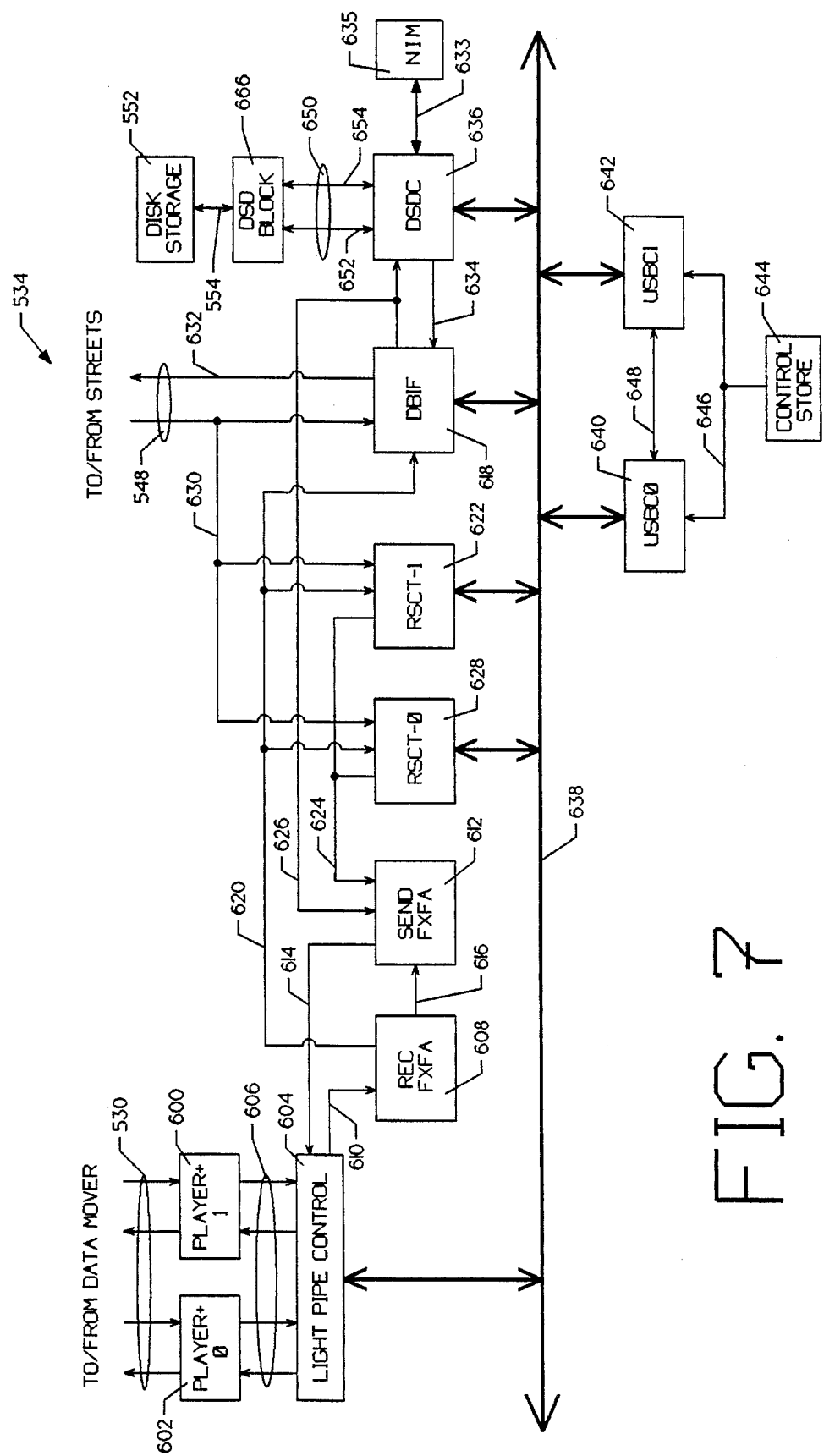
FIG. 7 is a schematic diagram of an exemplary embodiment of the host interface adapter block.

FIG. 7 is a schematic diagram of an exemplary embodiment of the host interface adapter block. For illustration, Host Interface Adapter (HIA) 534 of FIG. 6 is shown. It is recognized that HIA 544 may be similarly constructed. HIA 534 may comprise two Microsequencer Bus Controllers (USBC) 640, 642 which may be connected to a control store 644 via interface 646. The USBC's 640, 642 may access the HIA stations 628, 622, 618, and 636 via a micro bus 638. A player+0 602 and a player+1 600 may receive frames (or data elements) over fiber optic link 530. The term player+ refers to a fiber optic interface controller available from National Semiconductor which is called the Player Plus Chip Set. Player+0 602 may forward its frame to light pipe control 604 via interface 606. Similarly, player+1 600 may forward its frame to light pipe control 604 via interface 606. Light pipe control 604 may transfer the frames to a Receive Frame Transfer Facility (REC FXFA) 608 via interface 610. REC FXFA 608 may unpack the frames and may store control information in a Request Status Control Table-0 (RSCT-0) 628 and a RSCT-1 622 via interface 620. RSCT-0 628 and RSCT-1 622 may monitor the data that has been received from a corresponding data mover. The data which was contained in the frame received by REC FXFA 608 may be sent to the Database Interface (DBIF) station 618 via interface 620. DBIF 618 may forward the data over interface 632 to the streets.

Data received by the DBIF 618 from the streets via interface 548, may be sent to the Send Frame Transfer Facility (SEND FXFA) 612 via interface 626. Control information received via interface 630 may be sent to RSCT-0 628 and RSCT-1 622. SEND FXFA 612 may take the data and the control information provided by RSCT-0 628 and RSCT-1 622 via interface 624, and format a frame for transmission by light pipe control 604. Acknowledgements from REC FXFA 608 may be provided to SEND FXFA 612 via interface 616. The frame may be forwarded to light pipe control 604 via interface 614. Light pipe control 604 may create two copies of the frame received by SEND FXFA 612, and may provided a first copy to player+0 602 and a second copy to player+1 600 via interface 606. The frames may then be transmitted over the fiber optic links 530 to a corresponding data mover.

Referring back to control store 644, control store 644 may be used to store the instructions that are executed by USBC0 640 and USBC1 642. Control store 644, although in reality a RAM, is used as a read-only memory (ROM) during normal operation. Control store 644 may comprise seven (7)

SRAM devices (not shown). Each SRAM device may hold 32 * 1024 (K) 8-bit bytes of data. Each unit of data stored in control store 644 may comprise 44 bits of instruction, 8 bits of parity for the instruction, and 2 bits of address parity.

Control store 644 may be loaded with instructions at system initialization by a support computer system through a maintenance path (not shown). The parity bits and address bits are computed by a host computer system and appended to each instruction as it is stored. Later, as USBC0 640 and USBC1 642 read and execute the instructions, each instruction is fetched from control store 644 and parity values are computed from it. Each USBC compares the parity values computed against the parity checks stored in control store 644. If there are any discrepancies, control store 644 is assumed to be corrupted and an internal check condition is raised in the corresponding USBC's.

USBC0 640 and USBC1 642 are special purpose microprocessors that execute instructions to monitor and control the transfer of data on micro bus 638. There are two USBC's in the system to ensure that all data manipulations are verified with duplex checking. One of the USBC's 640 is considered to be the master while the other USBC1 642 is considered the slave. Only the master USBC0 640 drives the data on the micro bus 638, but both master USBC0 640 and slave USBC1 642 drive address and control signals to lower the loading on micro bus 638. The slave USBC1 642 may send the result of each instruction to the master USBC0 640 via interface 648. The master USBC0 640 may then compare this value to the result it computed. If the values are different, an internal check error condition is set and the program is aborted. A further discussion of the operation of HIA 534 may be found in the above referenced co-pending application, which is incorporated herein by reference.

In accordance with the present invention, a data save disk controller (DSDC) 636 may be coupled to micro bus 638 and may thus communicate with USBC0 640 and USBC1 642. DSDC 636 is further coupled to DBIF 618 via interfaces 634 and 626. DSDC may receive data elements from DBIF 618 via interface 626 and may provide data elements to DBIF 618 via interface 634. DSDC 636 is further coupled to a DSD block 666 via a DSD bus 650. In the exemplary embodiment, DSDC 636 may be coupled to DSD block 666 via a DSD address bus 652, a DSD data bus 654, and a number of control signals. DSD block 666 may be coupled to a data save disk system 552 via interface 554. DSD block may provide the interface function between DSDC 636 and data save disk system 552. A network interface module (NIM) 635 may be coupled to DSDC 636 via interface 633. NIM 635 may provide maintenance functions to DSDC 636, and to other elements within the system. USBC0 640 and USBC1 642 may control the operation of a download and/or upload operation between a nonvolatile memory 540 and data save disk system 552. This may include providing a timer function to delay the download and/or upload operation for a predetermined time period.

In this configuration, data save disk system 552 is directly coupled to nonvolatile memory 540 via DSD block 666, DSDC 636, DBIF 618, and system interface 536 (see FIG. 6). When a primary power source fails, the data elements stored in nonvolatile memory 540 may be downloaded directly to the data save disk system 552 without any intervention by an instruction processor 512 or I/O processor 516. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, data save disk system 552, system interface 536, and non-volatile memory 540 need to be powered by the secondary power source to effect the download operation. This may significantly increase the amount of time that the secondary power source may power the system thereby increasing the number of data elements that can be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 516. This may provide a high speed upload link between data save disk system 552 and nonvolatile memory 540.

Figure 8:
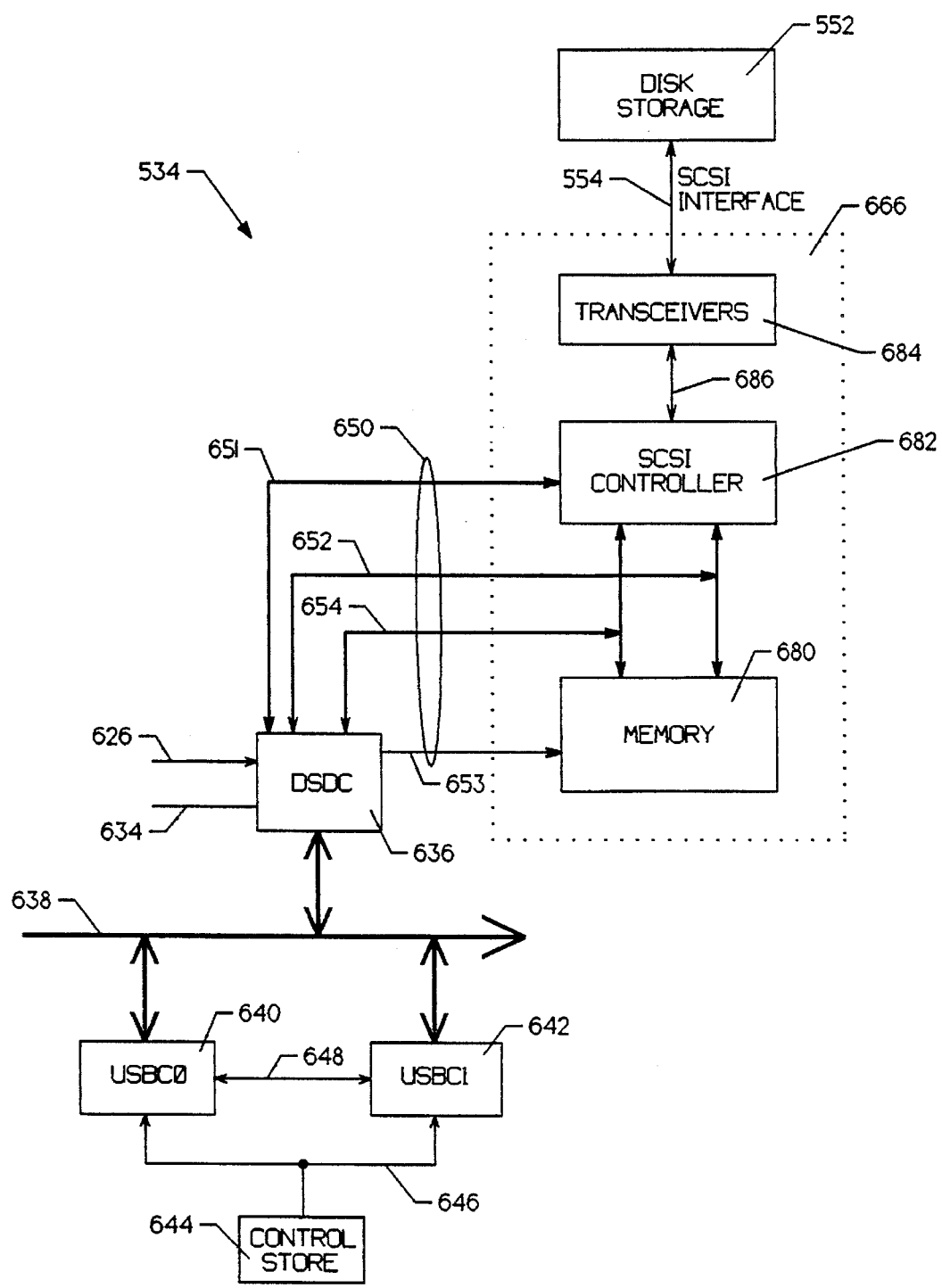
FIG. 8 is a partial schematic diagram of the host interface adapter block detailing the data save disk interface.

FIG. 8 is a partial schematic diagram of the host interface adapter block detailing the data save disk interface. DSD block 666 may comprise a memory 680, a disk controller 682, and a set of transceivers 684. A DSD bus 650 may couple DSDC 636, memory 680, and disk controller 682, and may comprise an address bus 652, and a data bus 654. DSD bus 650 may further comprise a number of disk controller control signals 651, and a number of memory control signals 653. DSD bus 650 may operate generally in accordance with a standard master/slave bus protocol wherein the DSDC 636, disk controller 682, and memory 680 may be slave devices, but only DSDC 636 and disk controller 682 may be master devices. That is, memory 680 may not be a master device in the exemplary embodiment.

Disk controller 682 may be coupled to transceivers 684 via interface 686. Transceivers 684 may be coupled to data save disk system 552 via interface 554. In a preferred mode, interface 554 may be a SCSI interface. Disk controller 682 may be a SCSI disk controller and data save disk storage system 552 may comprise at least one SCSI disk drive. In a preferred embodiment, disk controller 682 may be a NCR53C720 SCSI I/O Processor currently available from NCR corporation. Further, the at least one SCSI disk drives of data save disk storage 552 may comprise Hewlett Packard C3010 5.25" drives, Fijitsu M2654 5.25" drives, or Seagate ST12550/ND 3.5" drives. The data save disk system may comprise a set of 2-GByte SCSI Disks in sufficient quantity to store a single copy of the entire contents of the XPC. The NCR I/O processor may provide the necessary SCSI interface between DSDC 636 and the at least one disk drives of data save disk system 552.

As indicated with reference to FIG. 7, USBC0 640 and USBC1 642 may be coupled to MBUS 638. Further, USBC0 640 and USBC1 642 may be coupled to control store 644 via interface 646. DSDC 636 may be coupled to micro bus 638, DBIF 618, and DSD block 666.

Memory 680 may comprise at least one RAM device. In a preferred mode, memory 680 comprises four RAM devices. Because the disk storage system is an addition to an existing HIA design, control store 644 may not have enough memory locations to store the added pointers and temporary data needed to support the data save disk function. Therefore, a primary function of memory 680 is to store the pointers and temporary data for USBC0 640 and USBC1 642 such that HIA 534 may support the disk data save function. Another primary function of memory 680 is to store SCRIPTS for disk controller 682. SCRIPT programs and the application thereof are discussed in more detail below. Additions to the USBC microcode which may be stored in memory 680 may provide the following functionality: (1) initialization of the data save disk system 552 and microcode control areas; (2) data save operation which may copy all of the data and control elements from nonvolatile memory 540 to data save disk system 552; (3) data restore operation which may copy all of the data and control elements from data save system 552 to nonvolatile memory 540; (4) checking the status of the disks in data save disk storage system 552 and informing maintenance if restore data exists thereon; and (5) various error detection and error handling subroutines.

As indicated above, USBC0 640 and USBC1 642 may read pointers and/or temporary data or the like from memory 680 through DSDC 636. To accomplish this, USBC0 640 and USBC1 642 may provide an address to DSDC 636 wherein DSDC 636 may arbitrate and obtain control of DSD bus 650. Once this has occurred, DSDC 636 may provide the address to memory 680. Memory 680 may then read the corresponding address location and provide the contents thereof back to DSDC 636 via DSD bus 650. DSDC 636 may then provide the pointers and/or temporary data or the like to USBC0 640 and USBC1 642 for processing. By using this protocol, USBC0 640 and USBC1 642 may obtain pointers and/or temporary data from memory 680 to control the operation of a download and/or upload operation between nonvolatile memory 540 and data save disk system 552. This may include providing a timer function to delay the download and/or upload operation for a predetermined time period.

Data save disk system 552 is directly coupled to nonvolatile memory 540 via DSD block 666, DSDC 636, DBIF 618, and system interface 536 (see FIG. 6). When a primary power source fails, and under the control of USBC0 640 and USBC1 642, DBIF 618 may read the data elements from nonvolatile memory via interface 630 wherein DBIF 618 may provide the data elements to DSDC 636 via interface 626. DSDC 636 may then perform arbitration for DSD bus 650, wherein the data elements may be read by disk controller 682. In this instance, disk controller 682 may be the bus master. Disk controller 682 may then provide the data elements to transceivers 684 wherein the data elements may be written to data save disk system 552. This configuration may have a number of advantages. First, the speed at which the data elements may be downloaded from nonvolatile memory 540 to data save disk system 552 may be enhanced due to the direct coupling therebetween. Second, significant power savings may be realized because only HIA 534, system interface 536, non-volatile memory 540, and data save disk system 552 need to be powered by the secondary power source to effect the download operation. This may significantly increase the amount of time that the secondary power source may power the system thereby increasing the number of data elements that may be downloaded.

Similarly, once the primary power source is restored, data save disk system 552 may upload the data elements directly to nonvolatile memory via DSD block 666, DSDC 636, DBIF 618, and system interface block 536, without any assistance from an instruction processor 512 or I/O processor 514. This may provide a high speed upload link between data save disk system 552 and nonvolatile memory 540.

Figure 9A:
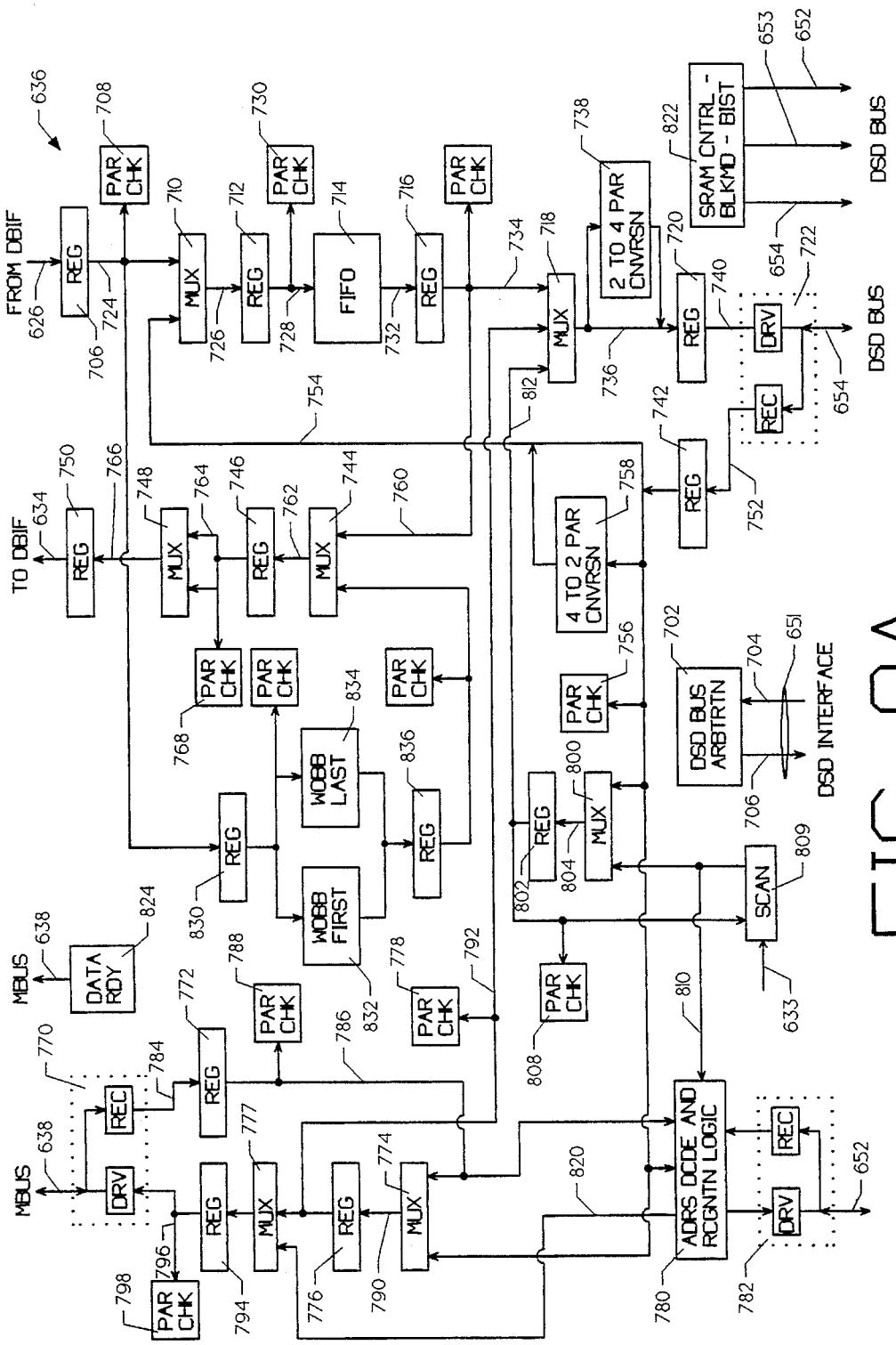
FIG. 9A is a block diagram of the Data Save Disk Controller (DSDC) shown in FIGS. 7–8.

FIG. 9A is a block diagram of the Data Save Disk Controller (DSDC) shown in FIGS. 7–8. The block diagram is generally shown at 636. DSDC 636 may comprise a DSD bus arbitration and control block 702 which may control the arbitration of DSD bus 650. DSD bus arbitration and control 702 may determine which device may assume the role of bus master of DSD bus 650. Preemptive priority is used to determine which device becomes bus master when more than one device is requesting bus mastership at any given time. In the exemplary embodiment, the priority order of bus mastership, from high priority to low priority, may be as follows: disk controller 682, USBC blocks 640, 642, and finally network interface module (NIM) 635. Memory 680 is not allowed to assume bus mastership of DSD bus 650 in the exemplary embodiment. DSD bus arbitration and control block 702, may be coupled to disk controller 682 via interface 651 (see FIG. 8). Interfaces 704 may be a bus request from disk controller 682 and interface 706 may be a bus acknowledge signal to disk controller 682.

In an exemplary embodiment, when disk controller 682 assumes bus mastership, it may relinquish bus ownership after a maximum of 16 bus cycles. Disk controller 682 may then wait 5 clock cycles before asserting a bus request to regain bus mastership. The 5 clock cycles provides a "fairness" delay to allow DSDC 636 to gain bus mastership if required.

DSDC 636 may comprise at least four basic data paths. A first basic data path may provide an interface between DBIF 618 and DSD bus 650. This path may comprise a register 706, a multiplexer 710, a register 712, a FIFO block 714, a register 716, a multiplexer 718, a data-out-register 720, and an I/O buffer block 722. Register 706 may receive data elements from DBIF 618 via interface 626. Register 706 may be coupled to multiplexer 710 via interface 724. Also coupled to interface 724 may be a parity check block 708. Parity Check block 708 may check the parity of a data element as it is released from register 706.

Multiplexer 710 may select interface 724 when transferring data between DBIF 618 and DSD bus 650. The data may then be provided to register 712 via interface 726 wherein register 712 may stage the data for FIFO 714. The data may then be provided to FIFO 714 via interface 728. Also coupled to interface 728 may be a parity check block 730. Parity Check block 730 may check the parity of a data element as it is released from register 712.

FIFO 714 may comprise a 34 bit by 64 word FIFO. FIFO 714 may function as a buffer between DBIF 618 and DSD bus 650. This may be desirable because disk controller 682 may have to arbitrate for DSD bus 650, thus causing an unpredictable delay. FIFO 714 may store the data that is transferred by DBIF 618 to DSDC 636 until disk controller 682 is able to gain control of DSD bus 650. Once disk controller 682 gains access to DSD bus 650, FIFO 714 may wait for eight (8) words to be transferred from DBIF 618 to FIFO 714 before sending the data over DSD bus 650.

Once released by FIFO 714, the data may be provided to register 716 via interface 732. Register 716 may store the output of FIFO 714. The data may then be provided to multiplexer 718 via interface 734. Multiplexer 718 may select interface 734 when transferring data between DBIF 618 and DSD bus 650. The data may then be provided to data-out-register 720 via interface 736, wherein data-out-register 720 may stage the data for I/O buffer block 722. Parity conversion block 738 may provide a two to four bit parity conversion. That is, data arriving from DBIF 618 via multiplexer 718 may only have two parity bits associated therewith. It may be desirable to convert the two parity bits to a four parity bit scheme. Data-out-register 720 may then provide the data to I/O buffer block 722 via interface 740. I/O buffer block 722 may comprise a plurality of bi-directional transceivers wherein each of the transceivers may be enabled to drive the data onto DSD bus 650 via interface 654.

A second basic data path of DSDC 636 may provide an interface between DSD bus 650 and DBIF 618. This path may comprise I/O buffer block 722, a data-in-register 742, multiplexer 710, register 712, FIFO block 714, register 716, a multiplexer 744, a register 746, a multiplexer 748, and a register 750. For this data path, I/O buffer block 722 may be enabled to accept data from DSD bus 650 and provide the data to data-in-register 742 via interface 752. Data-in-register 742 may provide the data to multiplexer 710 via interface 754. Also coupled to interface 754 may be a parity check block 756. Parity Check block 756 may check the parity of a data element as it is released by data-in-register 742. Parity conversion block 758 may provide a four to two bit parity conversion. That is, data arriving from DSD bus 650 may have four parity bits associated therewith while DBIF interface 634 may only have two parity bits associated therewith. It may be desirable to convert the four parity bits to a two parity bit scheme.

Multiplexer 710 may select interface 754 when transferring data between DSD bus 650 and DBIF 618. The data may then be provided to register 712 via interface 726 wherein register 712 may stage the data for FIFO 714. The data may then be provided to FIFO 714 via interface 728. Also coupled to interface 728 may be parity check block 730. Parity Check block 730 may check the parity of a data element as it is released from register 712.

FIFO 714 may function as a buffer between DSD bus 650 and DBIF 618. This may be desirable because DBIF 618 may have to wait to gain access to the streets via interface 632. FIFO 714 may store data that is transferred by DSD bus 650 until DBIF 618 can gain access to the streets.

Once released by FIFO 714, the data may be provided to register 716 via interface 732. Register 716 may store the output of FIFO 714. The data may then be provided to multiplexer 744 via interface 760. Multiplexer 744 may select the data provided by register 716 during a data transfer between DSD bus 650 and DBIF 618. Multiplexer 744 may then provide the data to register 746 via interface 762. Register 746 may then provide the data to multiplexer 748 via interface 764. Multiplexer 748 may select 16 bits at a time of a 32 bit word provided by register 746. This may be necessary because the DSD bus may comprise a 32 bit word while the interface to DBIF 618 may only be 16 bits wide. Also coupled to interface 764 may be parity check block 768. Parity Check block 768 may check the parity of a data element as it is released from register 746. Multiplexer 748 may then provide the data to register 750. Register 750 may provide the data to DBIF 618 via interface 634.

A third basic data path of DSDC 636 may provide an interface between MBUS 638 and DSD bus 650. This path may comprise a I/O buffer block 770, a register 772, an address decode and recognition logic block 780, a multiplexer 774, a register 776, multiplexer 718, data-out-register 720, and I/O buffer block 722. For this data path, USBC's 640, 642 may provide a request to DSDC 636 via MBUS 638. The request may comprise a data word, an address, and/or a number of control signals. In the exemplary embodiment, a request comprising an address and a number of control signals may be provided over MBUS 638 first wherein a data word may follow on MBUS 638, if appropriate. I/O buffer block 770 may receive the request via interface 638 and may provide the request to register 772 via interface 784. Register 772 may provide the request to multiplexer 774 and to an address decode and recognition block 780 via interface 786. Also coupled to interface 786 may be a parity check block 788. Parity Check block 788 may check the parity of the request as it is released from register 772. Multiplexer 774 may select interface 786 during transfers from MBUS 638 to DSD bus 650. Multiplexer 774 may provide the request to register 776 via interface 790. Register 776 may then provide the request to multiplexer 718 via interface 792. Also coupled to interface 792 may be a parity check block 778. Parity Check block 778 may check the parity of the request as it is released from register 776.

Multiplexer 718 may select interface 792 when transferring data between MBUS 618 and DSD bus 650. Multiplexer 718 may provide the data word to data-out-register 720 via interface 736 wherein data-out-register 720 may stage the data word for I/O buffer block 722. Parity conversion block 738 may provide a two to four bit parity conversion. That is, data arriving from MBUS 638 via multiplexer 718 may only have two parity bits associated therewith. It may be desirable to convert the two parity bits to a four parity bit scheme. Data-out-register 720 may then provide the data word to I/O buffer block 722 via interface 740. I/O buffer block 722 may be enabled to drive the data word onto DSD bus 650 via interface 654.

A fourth basic data path of DSDC 636 may provide an interface between DSD bus 650 and MBUS 638. This path may comprise I/O buffer block 722, data-in-register 742, parity conversion block 758, multiplexer 774, a multiplexer 777, register 776, a register 794, and I/O buffer block 770. I/O buffer block 722 may receive a data element from DSD bus 650. In an exemplary embodiment, the data element may comprise pointers and/or temporary data requested by USBC0 640 or USBC1 642 from memory 680. I/O buffer block 722 may provide the pointers and/or temporary data to data-in-register 742 via interface 752. Data-in-register 742 may provide the pointers and/or temporary data to parity conversion block 758 via interface 754. Parity conversion block 758 may provide a four to two bit parity conversion thereof. Parity conversion block 758, and register 742 may then provide the pointers and/or temporary data to multiplexer 774 via interface 754. Multiplexer 774 may select interface 754 when transferring data between DSD bus 650 and MBUS 638. Multiplexer 774 may then provide the pointer and/or temporary data to register 776 via interface 790. Register 776 may provide the pointers and/or temporary data to multiplexer 777 via interface 792. Multiplexer 777 may select interface 792 when transferring data between DSD bus 650 and MBUS 638. Multiplexer 777 may provide the pointers and/or temporary data to register 794. Register 794 may provide the pointers and/or temporary data to I/O buffer block 770 via interface 796. Also coupled to interface 796 may be a parity check block 798. Parity Check block 798 may check the parity of the data as it is released from register 794. I/O buffer block 770 may provide the pointers and/or temporary data to USBC0 640 or 642 via MBUS 638.

USBCs 640 and 642 do not interface directly with DSD bus 650 but rather may access memory 680 and disk controller 682 indirectly using registers in DSDC 636. For example, when USBC0 640 performs a read of memory 680, it initiates the transfer by writing a DSDC register 772 with the requested address. Register 772 may provide the address to address recognition logic block 780 via interface 786. The address may then be provided to register 773 (see FIG. 9B). Register 773 may then provide the address to multiplexer 852. Multiplexer 852 may select the output of register 773 when transferring an address from USBC0 640 to memory 680. Multiplexer 852 may then provide the address to address register 856 via interface 858.

DSDC 636 then performs bus arbitration, and provides the address to memory 680 via I/O transceiver block 782. Memory 680 then provides the requested data on DSD bus 650. DSDC 636 may then read the data on DSD bus 650 and provide the result to MBUS 638. Referring to FIG. 9A, register 742 may receive the read data word and may provide the read data word to multiplexer 774 via interface 754. Multiplexer 774 may then provide the read data word to register 776 wherein register 776 may provide the read data word to multiplexer 777. Multiplexer 777 may then provide the read data word to register 794 wherein the read data word may be provided to USBC0 640 via I/O buffer 770. Depending on whether an address or a data word is provided by USBC0 640 via MBUS 638, the corresponding address or data element may be routed to the appropriate location within DSDC 636.

In addition to providing the above reference data paths, DSDC 636 may provide a number of other functions. For example, logic may be provided to allow a test function of memory 680 and disk controller 682. For example, DSDC 636 may have a dynamic scan register 809 which may be coupled to NIM 635 via interface 633. NIM 635 may scan in an address and a function code into dynamic scan register 809. The address may then be provided to address register 851 (see FIG. 9B) within address decode and recognition logic block 780 via interface 810. Register 851 may provide the address to address output register 856 via multiplexer 852.

For a dynamic read operation of memory 680, the address may be an initial read address which may be scanned into dynamic scan register 809 as described above. Thereafter, the address may be automatically incremented by an auto-increment block 826 (see FIG. 9B) such that a number of successive read operations may be made to memory 680. After the initial address is provided, NIM 635 may provide a control word to dynamic scan register 809. The control word may comprise a word count and a function code. For a read operation, the function code may indicate a read function. The word count may be latched into a word count register 853 (see FIG. 9B) wherein after each read operation, the word count register may be decremented. When the word count register reaches a value of zero, DSDC 636 may terminate the above referenced read operation. For each read operation performed, the resulting data may be latched into data-in-register 742. A multiplexer 800 may then select interface 754 thereby storing the resulting data into register 802. The data may then be provided to dynamic scan register 809 via interface 812. The resulting data may then be scanned out of dynamic scan register 809 via NIM 635 for analysis.

For a write operation, the address may be an initial write address and function code which may be scanned into dynamic scan register 809 as described above. Thereafter, the address may also be automatically incremented by an auto-increment block 826 (see FIG. 9B) such that a number of successive write operations may be made to memory 680. For a write operation, the function code may indicate a write function. For each write operation performed, a corresponding data word may be scanned into dynamic scan register 809. The data word may be provided to multiplexer 800 wherein multiplexer 800 may provide the data word to register 802. Register 802 may provide the data word to multiplexer 718 via interface 812. Multiplexer 718 may provide the data word to data-out-register 720 via interface 736 wherein data-out-register 720 may stage the data word for I/O buffer block 722. Data-out-register 720 may then provide the data word to I/O buffer block 722 via interface 740. I/O buffer block 722 may be enabled to drive the data word to memory 680 via interface 654. The exemplary read and write operations discussed above may be used to perform tests on memory 680 and/or disk controller 682.

Another exemplary function that may be provided by DSDC 636 may be to support a partial block update function provided by host interface adapter 534. That is, in the exemplary system, a file may comprise a plurality of segments and each of the plurality of segments may comprise a plurality of blocks. Each of the blocks may comprise a plurality of words. When a host processor only updates a portion of a file, it may be advantages to only over-write the affected portions of the file to non-volatile memory 540. The host interface adapter block 534 supports the partial block update function. However, some of the supporting logic is located on DSDC ASIC 636. The partial block update function may increase the performance of the file caching system.

Register 830, wobb first block 832, wobb last block 834, and register 836 may support the partial block update function of the host interface adapter 534. A further discussion of the partial block update function may be found in the above referenced co-pending patent application Ser. No. 08/172,663, which is incorporated herein by reference.

SRAM control-block mode-and bist block 822 may provide a number of functions. For example, SRAM control-block mode-and bist block 822 may provide a number of control signals to memory 680 via interface 653. Other exemplary function may be to provide error detection and test to memory 680.

Finally, DSDC 636 may provide a data ready block 824 which may be coupled to MBUS 638. Data ready block 824 may indicate to USBC 640,642 when a corresponding read operation has been completed by DSDC 636.

Figure 9B:
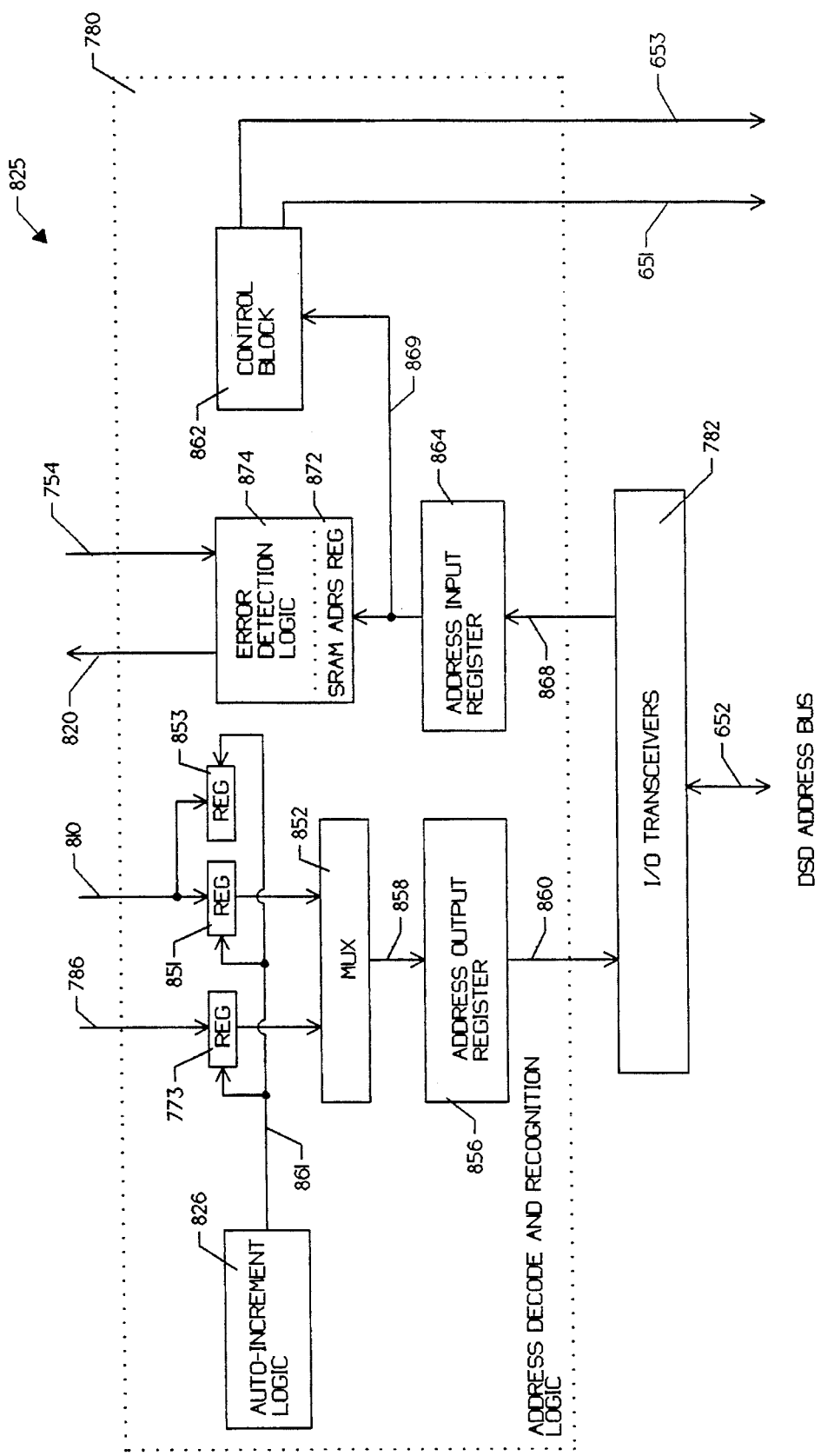
FIG. 9B is a block diagram showing applicable portions of the Address and Recognition Logic block of FIG. 9A.

FIG. 9B is a block diagram showing applicable portions of the Address and Recognition Logic block of FIG. 9A. The block diagram is generally shown at 825. In the exemplary embodiment, Address and Recognition Logic block 780 may comprise an address output register 856 and an address input register 864. Address output register 856 may be coupled to an outgoing port of I/O buffer block 782 via interface 860. Similarly, address input register 864 may be coupled to an in-going port of I/O buffer block 782 via interface 868.

An address may be provided to register 773 by MBUS 638 via interface 786, as described above. Further, an address may be provided to register 851 by dynamic scan register 809 via interface 810, as described above. When MBUS 638 is providing an address to DSD address bus 652, multiplexer 852 may select the output of register 773. Similarly, when NIM 635 is providing an address via dynamic scan register 809, multiplexer 852 may select the output of register 851. Multiplexer 852 may provide the selected address to address output register 856 via interface 858. Address output register 856 may provide the address to DSD address bus 652 via I/O buffer block 782.

Address recognition block 780 may determine if a request on interface 786 comprises an address. If the request comprises an address, corresponding control signals provided by register 772 via interface 786 may determine the appropriate format thereof. For example, one format for an address may indicate that the present address should be loaded, but each address thereafter should be generated by an automatic increment block 826 (see FIG. 11). Address recognition logic block 780 may make this determination and alert auto-increment block 826. Auto-increment block 826 may thereafter automatically increment and/or decrement the value in registers 773, 851, or 853 via interface 861.

Address input register 864 may be coupled to DSD address bus 652 via I/O buffer block 782. Address input register 864 may latch the contents of DSD address bus 652 and monitor the contents thereof. Address input register 864 may be coupled to a control block 862 via interface 869.

Control block 862 may monitor the DSD address via the address input register 864 and provide appropriate control signals to DSD bus 650 via interfaces 651 and 653. In the exemplary embodiment, control block 862 may provide control signals that memory 680 and disk controller 682 may not otherwise provide. For example, control block 862 may provide four (4) byte enable signals, and a read/write enable signal (see FIG. 10A–10B) to memory 680 via interface 653. Also, the NCR53C720 SCSI controller 682 requires a ready-in signal to be asserted by a slave device indicating that the slave device is ready to transfer data. DSDC ASIC 636 may provide the ready-in signal to NCR53C720 SCSI controller 682 via interface 651 for both DSDC 636 and memory 680.

Finally, an error detection logic block 874 may be coupled to address input register 864 via interface 869. Error detection logic block 874 may comprise an SRAM address register 872. SRAM address register 872 may capture an SRAM address when an SRAM read error is detected. That is, SRAM address register 872 may store the read address that is present on DSD address bus 650 in response to an SRAM read error. Error detection block 874 may monitor the data that is present in DSD bus 650 via interface 754. Error detection block 874 may thus perform a parity check or the like on the data presently read from memory 680. If an error exists, error detection block 874 may enable SRAM address register thereby capturing the current read address. This may identify the faulty read address within memory 680. Error detection block 874 may then provide the faulty read address to USBC0 640 for further processing via interface 820. For example, USBC0 640 may read and write various test patterns to the faulty read address to determine if the fault was caused by a soft error or a hard error. If the fault was caused by a soft error, the contents of memory 680 may be reloaded and the operation of the computer system may continue. However, if the fault was caused by a hard error, the operation of the computer system may be interrupted. Other error detection schemes are contemplated and may be incorporated into error detection block 874.

FIGS. 10A–10B comprise a table illustrating an exemplary bus description of the DSD bus of FIG. 8. The table is generally shown at 900. DSD bus 650 may comprise a number of fields. The type of fields can be generally broken down into data fields, address fields, parity fields, and control fields. The fields for an exemplary embodiment of DSD bus 650 are described below.

DSD bus 650 may comprise a 32 bit data bus as shown at 902. The 32 bit data bus is a bi-directional data bus and may serve as the main data path for all operations. The 32 bit data bus may be asserted by a bus master for write operations and a bus slave for read operations.

DSD bus 650 may further comprise a 4 bit data parity bus as shown at 904. Each of the four parity bits may correspond to predetermined data bits of 32 bit data bus 902. The 4 bit data parity bus may be used for error detection and correction purposes.

DSD bus 650 may further comprise a 30 bit address bus as shown at 906. The 30 bit address bus is a bi-directional address bus and may serve as the main address path for all operations. The 30 bit address bus may be asserted by a bus master.

DSD bus 650 may further comprise an address status line (ADS) as shown at 908. The address status line may be active low and when asserted by a bus master, may indicate that the value on the 30 bit address bus 906 are valid. In an exemplary mode, the address status line may be asserted to indicate a start of a bus cycle.

DSD bus 650 may further comprise a write/read line (WR\) as shown at 910. The write/read line may be active low and may indicate the direction of the data transfer relative to the bus master. The write/read line may be driven by the bus master.

DSD bus 650 may further comprise a hold line as shown at 912. The hold line may be asserted by the disk controller 682 to request bus mastership. The hold line may be active low and may be provided by the NCR53C720 SCSI I/O processor 682.

DSD bus 650 may further comprise a hold acknowledge (HLDA\) line as shown at 914. The hold acknowledge line may be asserted by DSD bus arbitration logic 786 to indicate that the previous bus master has relinquished control of the DSD bus 650. The hold acknowledge line may be active low.

DSD bus 650 may further comprise a bus clock (BCLK) line as shown at 916. The bus clock signal may control the DMA portion of the NCR53C720 SCSI I/O processor 682. The bus clock may be provided by DSDC 636.

DSD bus 650 may further comprise a chip reset line as shown at 918. The chip reset line may be active low and may force a synchronous reset of the NCR53C720 SCSI I/O processor 682. In the exemplary embodiment, the chip reset line may be asserted by DSDC 636 for a minimum of 15 bus cycles.

DSD bus 650 may further comprise a chip select (CS\) line as shown at 920. The chip select line may select the NCR53C720 SCSI I/O processor 682 as a slave device. In the exemplary embodiment, the chip select line may be active low and may be connected to address bit 6 of the 30 bit address bus discussed above.

DSD bus 650 may further comprise an interrupt (IRQ\) line as shown at 922. The interrupt line may be active low and may indicate that service is required from USBC0 640 and/or USBC1 642.

Referring to FIG. 10B, DSD bus 650 may further comprise four byte enable (BE) lines as shown at 924, 926, 928, and 930. Each of the bus enable lines may be active low and each may be asserted by the bus master. A first byte enable line (BE0) may enable the transfer of data over data bus lines 24–31. A second byte enable line (BE1) may enable the transfer of data over data bus lines 16–23. A third byte enable line (BE2) may enable the transfer of data over data bus lines 8–15. Finally, a fourth byte enable line (BE3) may enable the transfer of data over data bus lines 0–7.

DSD bus 650 may further comprise a ready-in (READYI\) line as shown at 932. The ready-in line may be provided by the slave device to the master device indicating that the slave device is ready to transfer data to the master device. The ready-in line may be active low and may be provided by DSDC 636 even if DSDC 636 is not the master of the bus.

DSD bus 650 may further comprise a ready-out (READYO\) line as shown at 934. The ready-out line may be asserted to indicate the end of a slave cycle. In the exemplary embodiment, the ready-out line may be active low and may be provided by disk controller 682 to terminate a slave cycle.

DSD bus 650 may further comprise a master line as shown at 936. The master line may be asserted by the NCR53C720 I/O processor 682 to indicate it has become bus master. The master line may be active low.

DSD bus 650 may further comprise a bus mode select (BS) bus as shown at 938. The bus mode select bus may select the bus mode and addressing mode of the NCR53C720 I/O processor 682. In the exemplary embodiment, the bus mode select bus is set to "010" thereby selecting a 80386DX like bus mode (bus mode 4) and the big endian addressing mode.

Finally, DSD bus 650 may further comprise a scripts autostart mode (AUTO\) line at shown at 940. The scripts autostart mode line selects either auto or manual scripts start mode. Script routines may be stored in memory 680 and may control a RISC processor in NCR53C720 SCSI I/O processor 682. When scripts autostart mode is set low, the execution of the scripts programs starts at address zero of a DSP register within NCR53C720 SCSI I/O processor 682, immediately following a chip reset. When scripts autostart mode is set high, the execution of the scripts programs starts at an address which corresponds to a value which is loaded into the DSP register by USBC0 640 and/or USBC1 642, immediately following a chip reset. In the exemplary embodiment, the scripts auto start mode line is set to one.

As indicated with reference to FIG. 8, a number of control signals may be provided between DSDC 636 and disk controller 682 via interface 651. These signals may include the signals shown at 906, 908, 910, 912, 914, 916, 918, 920, 922, 932, 934, 936, and 938. Similarly, a number of control signals may be provided between DSDC 636 and memory 680 via, interface 653. These signals may include a memory read/write enable signal and the four byte enable signals shown at 924, 926, 928 and 930.

Figure 11:
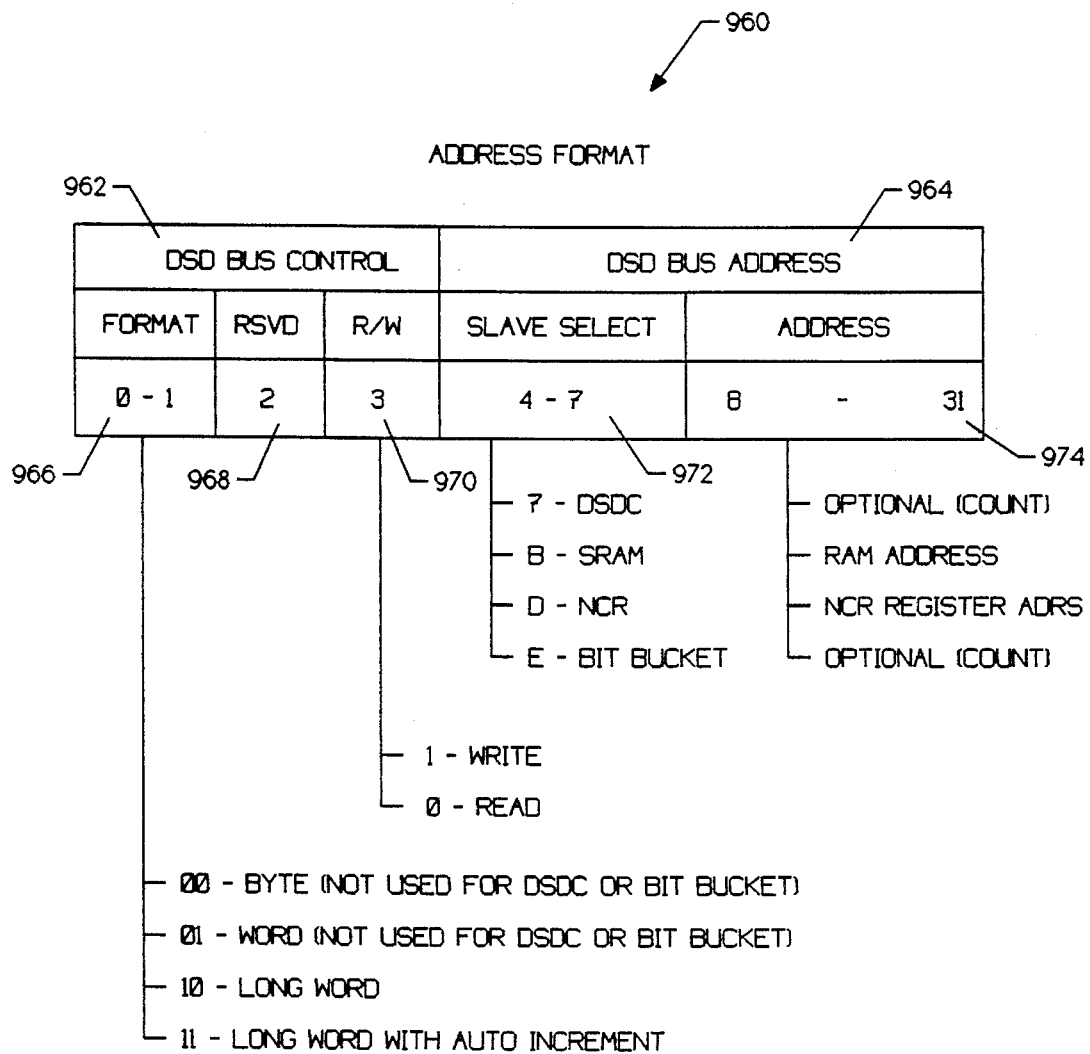
FIG. 11 is a table illustrating an exemplary address format for the address field of the DSD bus of FIG. 8.

FIG. 11 is a table illustrating an exemplary address format for the address field of the DSD bus of FIG. 8. The table is generally shown at 960. The address format of the address field of DSD bus 650 may comprise DSD bus control signals 962 and DSD bus address signals 964. The DSD bus control signals may comprise a format field 966, a reserved field 968, and a read/write field 970. The DSD address signals may comprise a slave select field 972 and an address field 974.

The format field 966 may specify the format of a corresponding address. For example, the format field may specify the format of a corresponding address as a long word or a long word with auto increment. The auto increment option is further discussed above with reference to FIG. 9A and FIG. 9B. The read/write field 970 may indicate whether the corresponding address is requesting a read or write operation.

The slave select field 972 may indicate which of the three devices attaches to DSD bus 650 is to be the slave. That is, if DSDC 636 has bus mastership and is providing the address, the slave select field may indicate whether NCR53C720 682 or memory 680 is to be the slave. Finally, the address field 974 provides a valid address to the selected slave device. That is, if memory 680 is the slave device, the address field 974 may provide a valid memory address thereto. Under some conditions, the address field is optional as shown. That is, when DSDC 636 is the slave device, the address field is optional. The slave select field identifier shown below slave select field 972 correspond to the address field identifiers shown below address field 974. Format bits 0 and 1, and address bits 30 and 31 may be decoded to provide the bi-directional byte enable signals 924, 926, 928, and 930 as shown in FIG. 10B.

Figure 12:
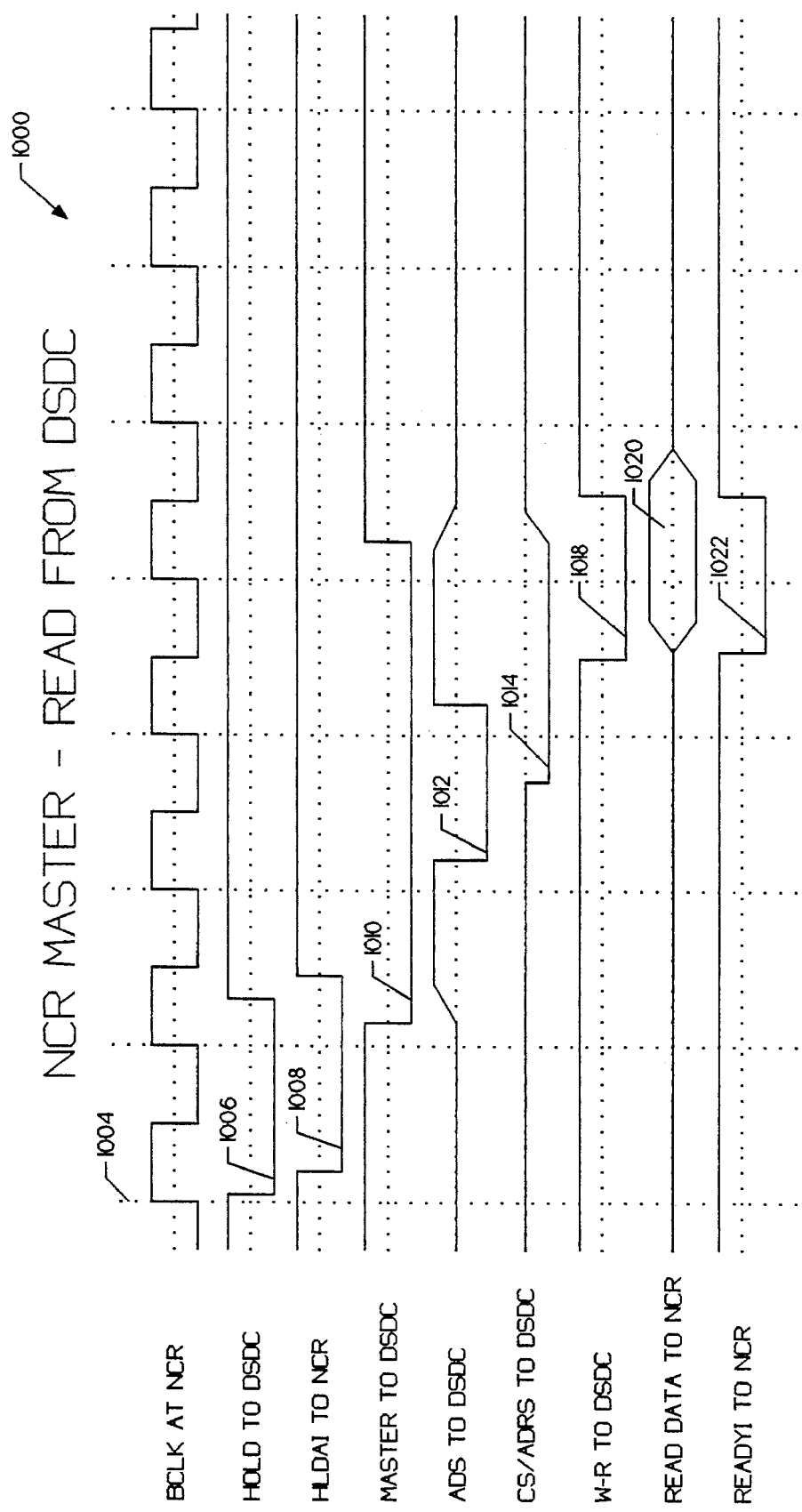
FIG. 12 is a timing diagram illustrating an exemplary read cycle on the DSD bus wherein the NCR chip is the master and the DSDC device is the slave.

FIG. 12 is a timing diagram illustrating an exemplary read cycle on the DSD bus wherein the NCR chip is the master and the DSDC device is the slave. The timing diagram is generally shown at 1000. In the exemplary embodiment, NCR53C720 682, memory 680, and DSDC 636 are coupled to the DSD bus 650. Tri-state transceivers are used by all three devices to interface with the bi-directional lines of the DSD bus 650. Data transfer cycles are initiated and terminated by whichever device is bus master at given time. The direction of data transfer (read/write) is relative to the bus master. Only one device can be bus master for a given data transfer cycle.

When one of the three devices is the bus master, one of the two remaining devices may be the bus slave, and is either the source (read) or destination (write) of the data transfer. The third device on DSD bus 650 is inactive. NCR53C720 682 and DSDC 636 may be either a bus master or a bus slave, while memory 680 may only be a bus slave. Arbitration logic 786 in DSDC 636 may determine which device will be the next bus master when the present bus master relinquishes control of DSD bus 650.

Referring specifically to NCR53C720 682, NCR53C720 682 arbitrate for bus mastership to fetch SCRIPTS instructions from memory 680 and to transfer data to/from the SCSI interface 554. After an instruction fetch or data transfer is complete, NCR53C720 682 may relinquish bus mastership. When executing block move instructions, NCR53C720 682 may relinquish bus mastership after transferring eight long words. However, if more data needs to be transferred, NCR53C720 682 may wait 5 to 8 clock cycles and then initiates arbitration to regain bus mastership to transfer up to 8 more long words. This process may continue until the block move instruction is complete. In the exemplary embodiment, the effective data transfer rate of a block move instruction to/from the SCSI disk(s) may be in excess of 20 MB/s.

Referring specifically to FIG. 12, wherein an exemplary read operation is shown with NCR53C720 682 as bus master and DSDC 636 is bus slave. The signal names provided along the left side of timing diagram 1000 generally correspond to the signals described with reference to FIGS. 10A and 10B.

At time 1004, NCR53C720 682 may assert a hold signal as shown at 1006, indicating to all of the devices coupled to DSD bus 650 that NCR53C720 682 is requesting bus mastership. Arbitration logic 786 within DSDC 636 may receive the hold signal 1006 and may assert a hold acknowledge signal in response thereto, as shown at 1008, indicating that the previous bus master has relinquished control of DSD bus 650. On the next bus clock cycle, NCR53C720 682 may assert a master signal to DSDC 636 as shown at 1010, indicating to DSDC 636 that NCR53C720 682 has become bus master of DSD bus 650. NCR53C720 682 may then assert an address status signal as shown at 1012. The address status signal indicates the start of a bus cycle. Shortly thereafter, and while the address status signal is still asserted, NCR53C720 682 may provide an address to DSDC 636 as shown at 1014. The select slave field of the address may select DSDC 636 to be the slave for this bus transaction.

NCR53C720 682 may then provide a read/write signal 1018 to DSDC 636. The read/write signal 1018 indicates that NCR53C720 682 is requesting to read data from DSDC 636. Finally, DSDC 636 may provide a ready-in 1022 signal to NCR53C720 682, indicating that DSDC 636 is ready to transfer data thereto. The read data on DSD bus 650 may then be provided as shown at 1020.

Figure 13:
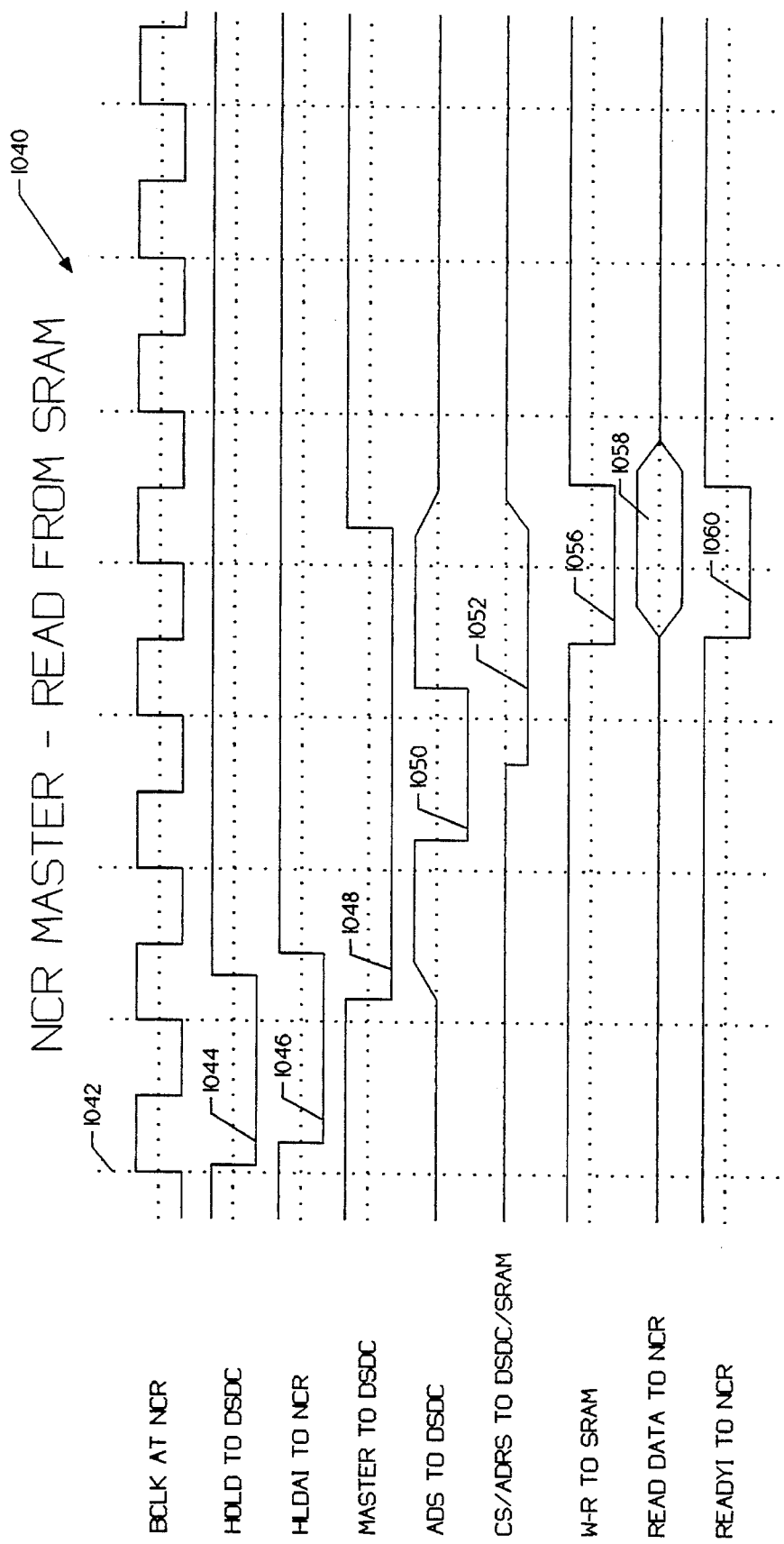
FIG. 13 is a timing diagram illustrating an exemplary read cycle on the DSD bus wherein the NCR chip is the master and the SRAM device is the slave.

FIG. 13 is a timing diagram illustrating an exemplary read cycle on the DSD bus wherein the NCR chip is the master and the SRAM device is the slave. The timing diagram is generally shown at 1040. The signal names provided along the left side of timing diagram 1040 generally correspond to the signals described with reference to FIGS. 10A and 10B.

At time 1042, NCR53C720 682 may assert a hold signal as shown at 1044, indicating to all of the devices coupled to DSD bus 650 that NCR53C720 682 is requesting bus mastership. Arbitration logic 786 within DSDC 636 may receive the hold signal 1044 and may assert a hold acknowledge signal in response thereto, as shown at 1046, indicating that the previous bus master has relinquished control of DSD bus 650. On the next bus clock cycle, NCR53C720 682 may assert a master signal to DSDC 636 as shown at 1048, indicating to DSDC 636 that NCR53C720 682 has become bus master of DSD bus 650. Note that it is not necessary to provide the master signal to memory 680 because memory 680 cannot be a bus master. NCR53C720 682 may then assert an address status signal as shown at 1050. The address status signal indicates the start of a bus cycle. Shortly thereafter, and while the address status signal is still asserted, NCR53C720 682 may provide an address to DSDC 636 and memory 680 as shown at 1052. The select slave field of the address may select memory 680 to be the slave for this bus transaction.

NCR53C720 682 may then provide a read/write signal 1056 to memory 680. The read/write signal 1056 indicates that NCR53C720 682 is requesting to read data from memory 680. Finally, memory 680 may provide a ready-in signal 1060 to NCR53C720 682, indicating that memory 680 is ready to transfer data thereto. The read data on DSD bus 650 is shown at 1058.

Figure 14:
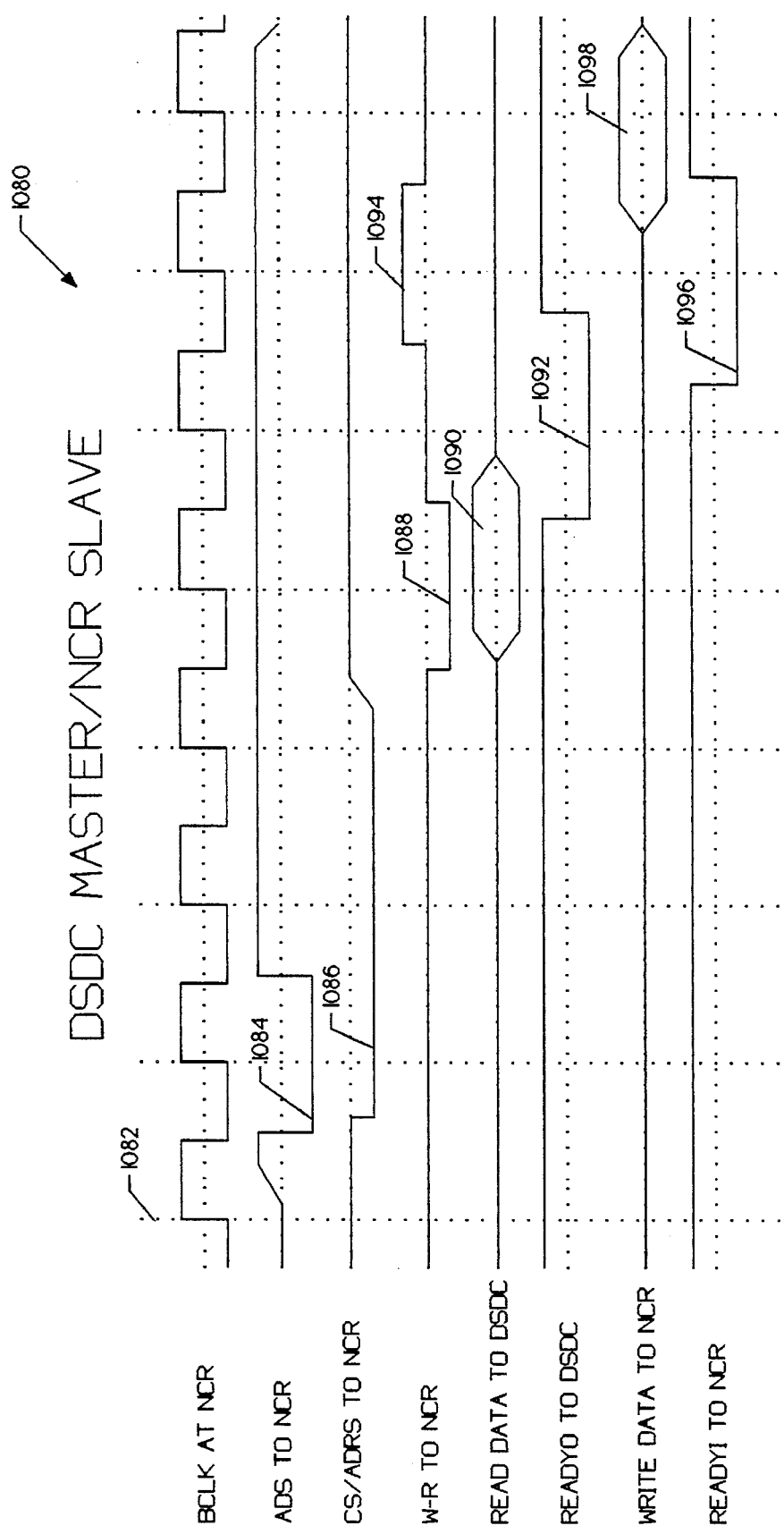
FIG. 14 is a timing diagram illustrating an exemplary read and write cycle on the DSD bus wherein the DSDC device is the master and the NCR chip is the slave.

FIG. 14 is a timing diagram illustrating an exemplary read and write cycle on the DSD bus wherein the DSDC device is the master and the NCR53C720 is the slave. The timing diagram is generally shown at 1080. At time 1082, DSDC 636 may assert an address status signal as shown at 1084. The address status signal indicates to NCR53C720 682 the start of a bus cycle. Shortly thereafter, and while the address status signal is still asserted, DSDC 636 may provide a chip select signal and an address to NCR53C720 682 and memory 680 as shown at 1086. The chip select signal selects the NCR53C720 682 as the slave device. The chip select signal may comprise the slave select field 972 of the DSD address 964.

DSDC 636 may then provide a read/write signal 1088 to NCR53C720 682. At 1088, DSDC 636 provides a low on the read/write signal indicating that DSDC 636 is requesting a read from NCR53C720 682. NCR53C720 682 may then provide the requested read data to DSDC 636 as shown at 1090. Thereafter, NCR53C720 682 may provide a ready-out signal 1092 to DSDC 636 to indicate the end of the slave bus cycle. DSDC 636 may then provide a read/write signal 1094 to NCR53C720 682. At 1094, DSDC 636 provides a high on the read/write signal indicating that DSDC 636 is requesting to write to NCR53C720 682. DSDC 636 may provide a ready-in signal 1096 to NCR53C720 682, indicating that DSDC 636 is ready to write data thereto. DSDC 636 may then provide the write data to NCR53C720 682 as shown at 1098.

Figure 15:
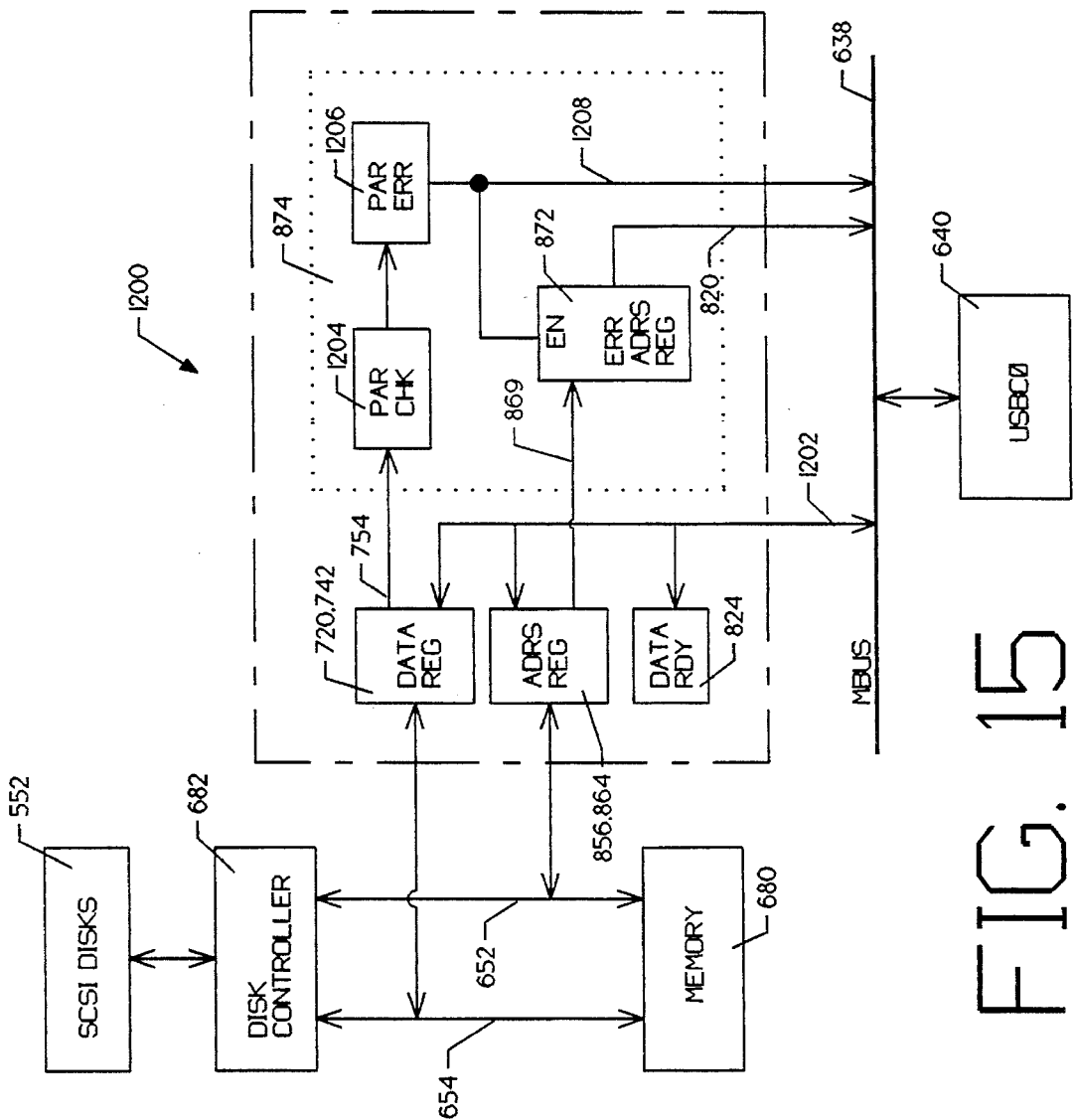
FIG. 15 is a block diagram of the exemplary computer system shown in FIG. 6 through FIG. 14 which incorporates an exemplary embodiment of the present invention.

FIG. 15 is a block diagram of the exemplary computer system shown in FIG. 6 through FIG. 14 which incorporates an exemplary embodiment of the present invention. The block diagram is generally shown at 1200. As discussed with reference to FIG. 6 through FIG. 14, DSDC 636 may have a data register 720,742 and an address register 856,864. USBC0 640 may write and read data elements to/from memory 680 via data register 720,742 and address register 856,864. DSDC 636 may further have an error detect block 874 (see FIG. 9B). Error detect block 874 may comprise a parity check circuit 1204, a parity error circuit 1206, and an memory address register 872.

As indicated with reference to FIG. 9B, error detect block 874 may monitor the read data received by DSDC 636 via interface 754. That is, error detect block 874 may monitor the read data words requested by USBC0 640. Error detect block 874 may perform parity check of the read data word via parity check circuit 1204. Parity check circuit 1204 may provide the results of the parity check to parity error block 1206. Parity error block 1206 may provide an error signal to an enable input of memory address register 872. Parity error block 1206 may further provide the error signal to USBC0 640 via interface 1208. In the exemplary embodiment, USBC0 640 may provide the function of test block 56 of FIG. 3.

Memory address register 872 may be coupled to address input register 864 via interface 869. Address input register 864 may monitor the address on DSD address bus 652. When parity error block 1206 provides an error to the enable input of memory address register 872, thereby indicating a parity error in the corresponding read data word, memory address register 872 may latch in the corresponding "bad" read address. Memory address register 872 may then provide the "bad" read address to USBC0 640 via interface 820.

As indicated above, USBC0 640 may provide the function of test block 56 of FIG. 3. That is, USBC0 640 may write and read a number of predetermined test patterns to the "bad" read address of memory 680 via DSDC 636, as described above. It is further contemplated that USBC0 640 may write and read the number of predetermined test patterns to a predetermined range of read addresses to help isolate the error. By writing and reading a number of predetermined test patterns to the "bad" read address of memory 680, USBC0 640 may determine if the error was caused by a soft error or a hard error. The predetermined patterns may include a parity pattern, a checkerboard pattern, an all zeros pattern, an all ones pattern, etc., or any combination thereof. In the exemplary embodiment, if the same error exists after writing and reading a number of test patterns to the "bad" read address of memory 680, the error is assumed to be a hard error.

If USBC0 640 determines that the error was caused by a soft error within memory 680, USBC0 640 may reload the contents of memory 680 via DSDC 636. However, it is contemplated that a support controller (NIM) or the like may perform the reload function. In an exemplary embodiment, USBC0 640 may only reload the "bad" read address location, and/or the predetermined range of read addresses, rather than the entire contents of memory 680. However, it is contemplated that the entire contents of memory 680 may be reloaded, or even all devices on a corresponding card. As stated above, a soft error may be considered non-fatal. Thus, USBC0 640 may enable the system to resume operation. If USBC0 640, however, determines that the error was caused by a hard error, the error may be considered fatal and the USBC0 640 may abort the operation of the computer system.

The exemplary embodiment may allow errors detected in memory 680 to be handled immediately after they are detected, rather than aborting the operation of the corresponding computer system and waiting for a support controller (NIM) to analyze the error. As discussed above, this may significantly enhance the reliability and performance of a corresponding computer system. To further help ensure system reliability, USBC 640 may periodically read and/or write each memory location within the memory 680 wherein the present invention may perform error detection thereon. If an error is detected, the present invention may then determine the source and nature of the error as described above.

Figure 16:
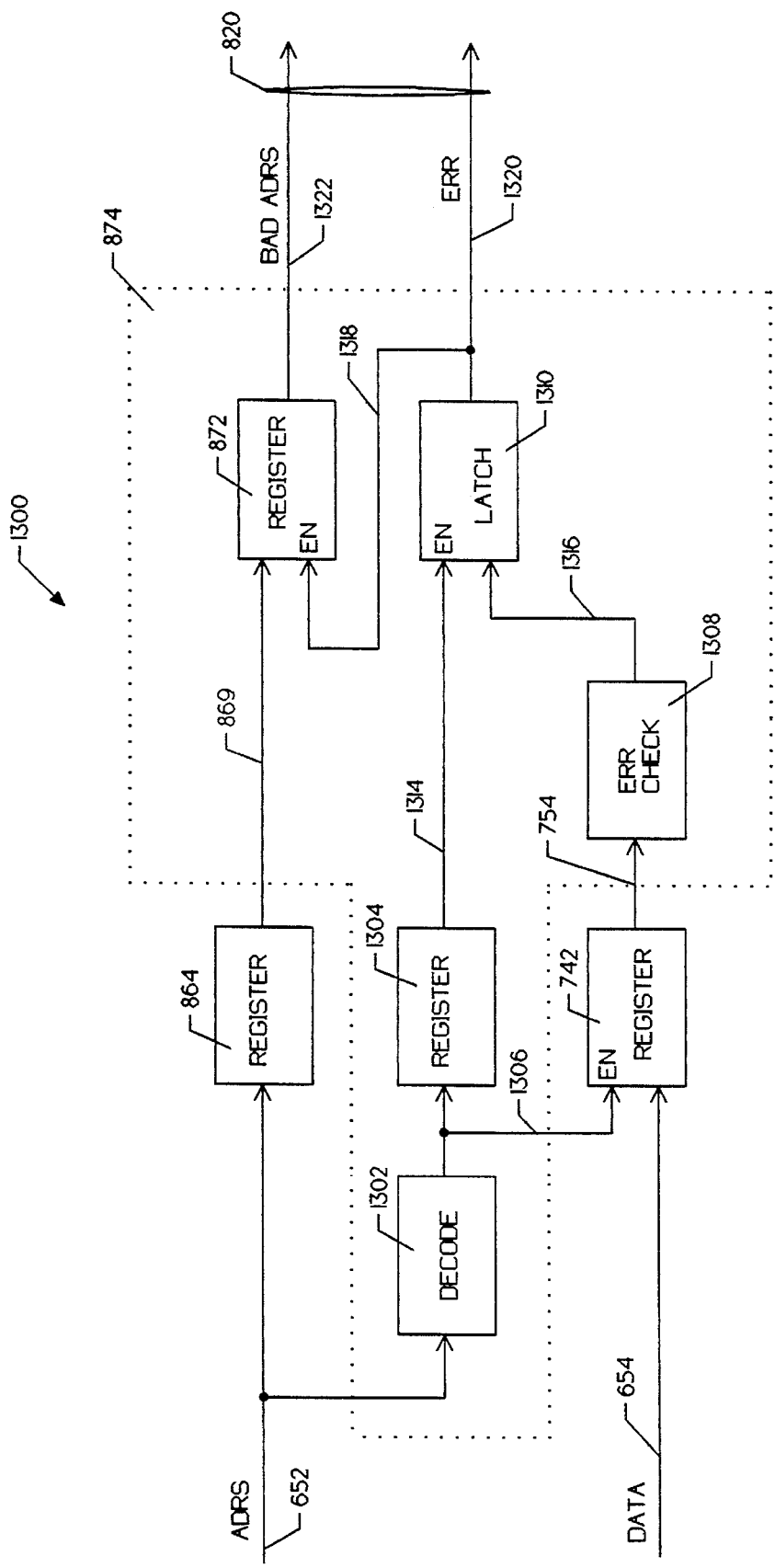
FIG. 16 is a schematic diagram showing another exemplary implementation of the error detect block of FIG. 15.

FIG. 16 is a schematic diagram showing another exemplary implementation of the error detect block of FIG. 15. The schematic diagram is generally shown at 1300. The error detect block of FIG. 15 is generally shown at 874. Error detect block 874 may be coupled to address input register 864 and data input register 742 (see FIG. 9A and FIG. 9B). Address input register 864 may be coupled to DSD address bus 652. Further, data input register 742 may be coupled to DSD data bus 654. Error detect block 874 may monitor data words provided to data bus 26 and detect any errors therein.

In the exemplary embodiment, error detect block 874 may monitor all read operations performed on memory 680 by disk controller 682 and USBC0 640 via DSDC 636. When an error is detected on data bus 654, error detect block 874 may store the corresponding read address which is present on address bus 652. In this way, the location of the error within memory 680 may be identified. That is, the particular address location within memory 680 which produced the error may be identified. Error detect block 874 may then provide the "bad" read address and an error signal to USBC0 640 via interface 820 (see FIG. 9A and FIG. 9B).

In the exemplary embodiment, a decoder 1302 may be coupled to address bus 652. Decoder 1302 may monitor address bus 652 and determine if a read operation is being performed on memory 680. In an exemplary embodiment, address bus 652 may comprise a number of bits which may indicating if a read operation is being performed on memory 680. For example, and referring to FIG. 11, slave select bits 972 may indicate if memory 680 is currently being accessed. Further, R/W field 970 may indicate if a read operation or a write operation is being performed thereon. Decoder 1302 may decode these bits and assert interface 1306 when a read operation of memory 680 is being performed. During each bus cycle, the corresponding address on address bus 652 may be latched into address input register 864.

Input data register 742 may be coupled to data bus 654. Input data register 742 may be enabled by decoder 1302 via interface 1306. As indicated above, interface 1306 may be asserted by decoder 1302 when a read operation is being performed on memory 680. Input data register 742 may store the corresponding data word on data bus 654 whenever a read operation is being performed on memory 680. Similarly, a register 1304 may latch the output of decoder 1302, thereby enabling latch 1310 via interface 1314. That is, when decoder 1302 detects a read operation of memory 680, register 1304 stores the value on interface 1306, thereby causing latch 1310 to go transparent. Meanwhile, input data register 742 provides the corresponding data word to parity check block 1308 via interface 754. Parity check block 1308 may check the parity of the data word. Although a parity error detection technique is used in the exemplary embodiment, it is contemplated that any other error detection means may be used. If an error is detected by parity check block 1308, an error signal may be provided to latch 1310 via interface 1316. Since register 1304 has asserted the enable input of latch 1310 via interface 1314, latch 1310 is transparent and the error signal may be provided to error line 1320.

The error signal may also be provided to an enable input of a memory address register 872 via interface 1318. Memory address register 872 may be coupled to address input register 864 via interface 869. When an error signal is provided to the enable input of memory address register 872, the corresponding address stored in address input register 864 may be latched into memory address register 872. That is, the corresponding address location of memory 680 may be latched into memory address register 872 when an error is detected during a read operation of memory 680. The corresponding "bad" address may be provided to USBC0 640 via interface 1322.

If a read operation is not detected by decoder 1302, interface 1306 is not asserted and the corresponding data word is not latched into input data register 742. Further, latch 1310 is not enabled thereby prohibiting the output of parity check block 1308 from reaching interface 1320.

Figure 17:
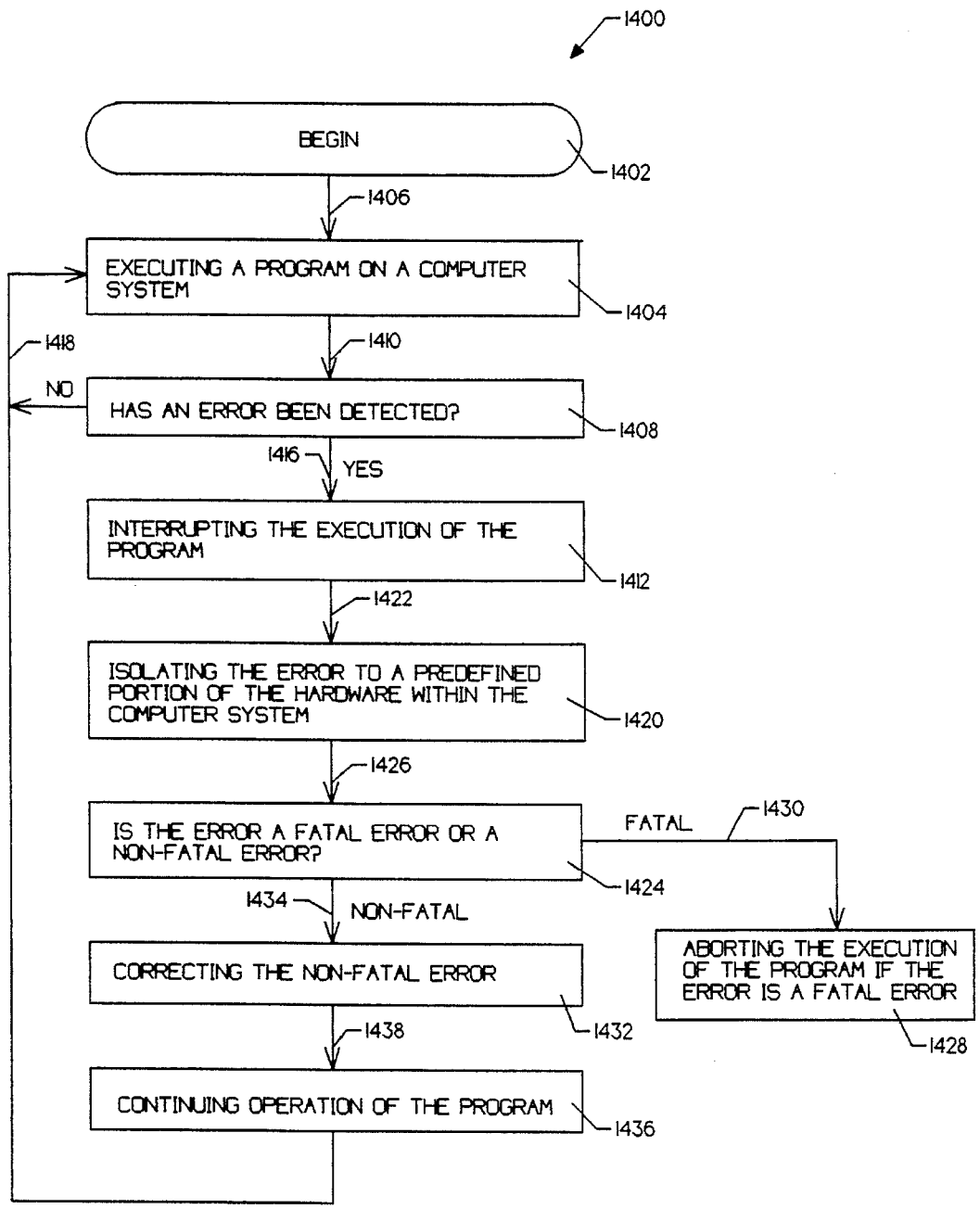
FIG. 17 is a flow diagram showing a first exemplary method of the present invention.

FIG. 17 is a flow diagram showing a first exemplary method of the present invention. The flow diagram is generally shown at 1400. The algorithm is entered at element 1402, wherein control is passed to element 1404 via interface 1406. Element 1404 executes a program on a computer system. Control is then passed to element 1408 via interface 1410. Element 1408 determines whether an error has been detected. If an error has not been detected, control is passed back to element 1404 via interface 1418. If an error has been detected, control is passed to element 1412 via interface 1416. Element 1412 interrupts the execution of the program. Control is then passed to element 1420 via interface 1422. Element 1420 isolates the error to a predefined portion of the hardware within the computer system. Control is then passed to element 1424 via interface 1426. Element 1424 determines whether the error is a fatal error or a non-fatal error. If the error is a fatal error, control is passed to element 1428 via interface 1430. Element 1428 aborts the execution of the program if the error is a fatal error. Referring back to element 1424, if the error is a non-fatal error, control is passed to element 1432 via interface 1434. Element 1432 corrects the non-fatal error. Control is then passed to element 1436 via interface 1438. Element 1436 continues the operation of the program. Control is then passed back to element 1404 via interface 1418.

Figure 18:
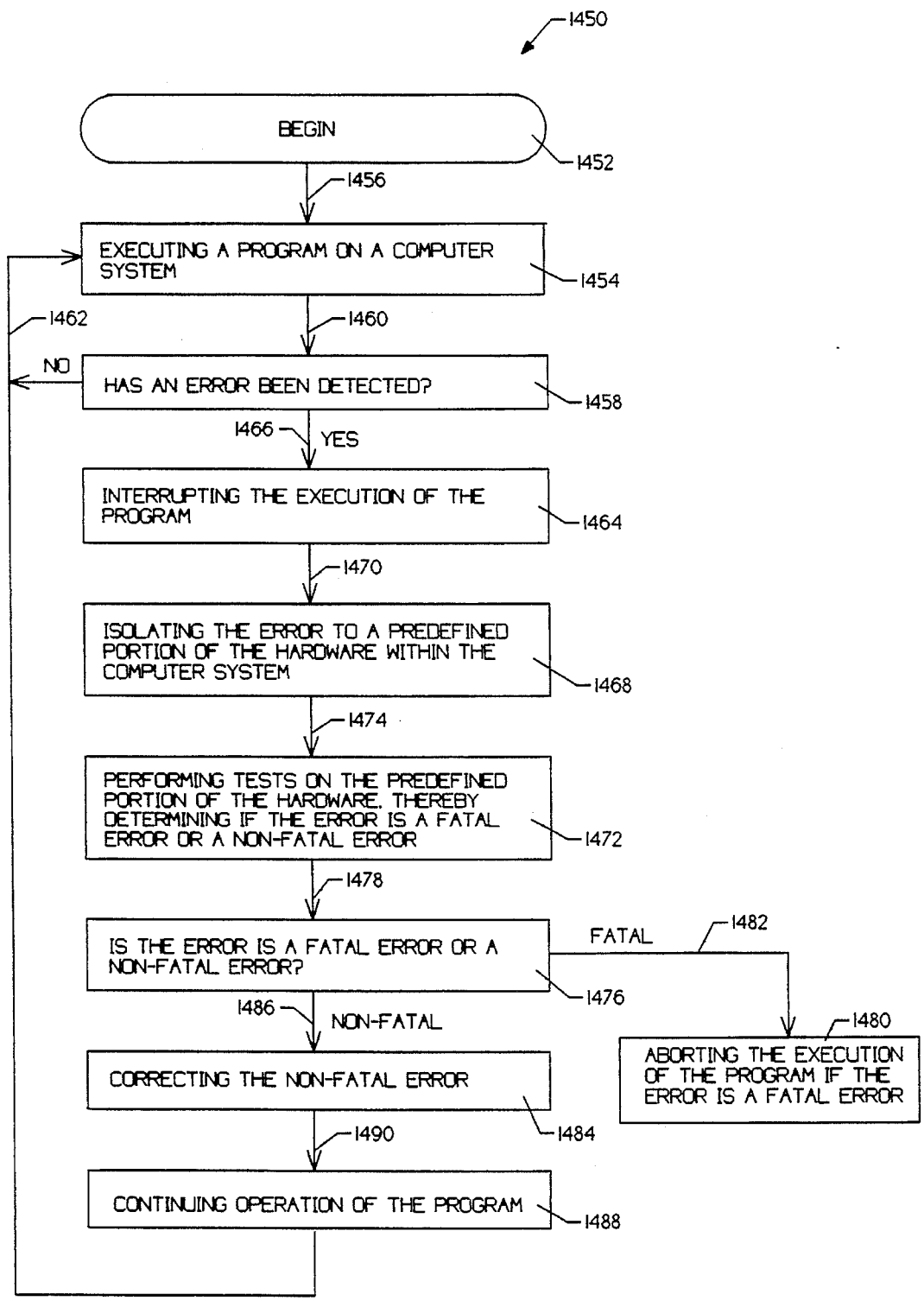
FIG. 18 is a flow diagram showing a second exemplary method of the present invention.

FIG. 18 is a flow diagram showing a second exemplary method of the present invention. The flow diagram is generally shown at 1450. The algorithm is entered at element 1452, wherein control is passed to element 1454 via interface 1456. Element 1454 executes a program on a computer system. Control is then passed to element 1458 via interface 1460. Element 1458 determines whether an error has been detected. If an error has not been detected, control is passed back to element 1454 via interface 1462. If an error has been detected, control is passed to element 1464 via interface 1466. Element 1464 interrupts the execution of the program temporarily. Control is then passed to element 1468 via interface 1470. Element 1468 isolates the error to a predefined portion of the hardware within the computer system. Control is then passed to element 1472 via interface 1474. Element 1472 performs tests on the predefined portion of the hardware, thereby determining if the error is a fatal error or a non-fatal error. Control is then passed to element 1476 via interface 1478. Element 1476 determines whether the error is a fatal error or a non-fatal error. If the error is a fatal error, control is passed to element 1480 via interface 1482. Element 1480 aborts the execution of the program. Referring back to element 1476, if the error is a non-fatal error, control is passed to element 1484 via interface 1486. Element 1484 corrects the non-fatal error. Control is then passed to element 1488 via interface 1490. Element 1488 continues the operation of the program. Control is then passed back to element 1454 via interface 1462.

Figure 19:
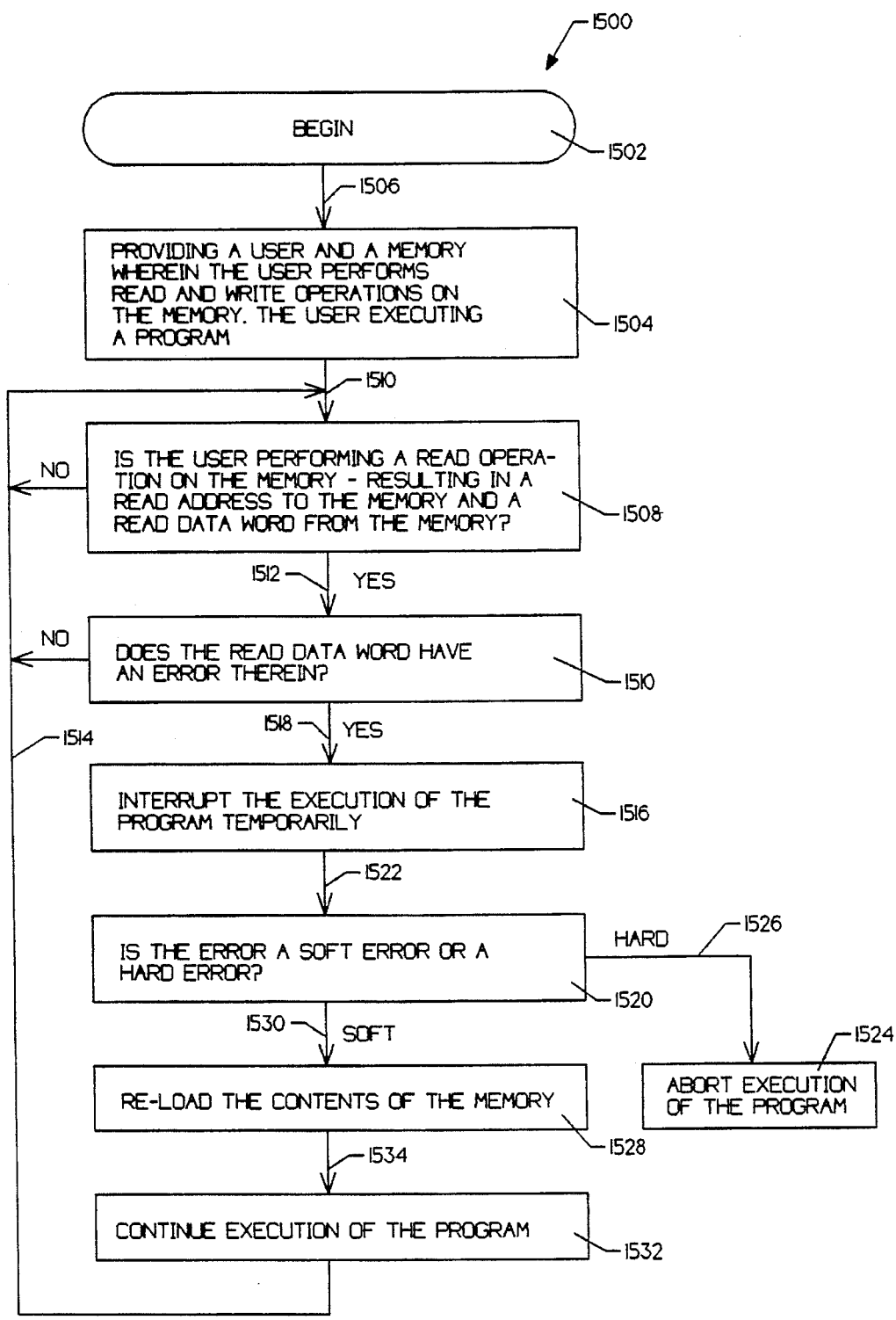
FIG. 19 is a flow diagram showing a third exemplary method of the present invention.

FIG. 19 is a flow diagram showing a third exemplary method of the present invention. The flow diagram is generally shown at 1500. The algorithm is entered at element 1502, wherein control is passed to element 1504 via interface 1506. Element 1504 provides a user and a memory, wherein the user performs a number of read and/or write operations on the memory while executing a program. Control is then passed to element 1508 via interface 1510. Element 1508 determines whether the user is performing a read operation on the memory, thereby resulting in a read address to the memory and a read data word from the memory. If the user is not performing a read operation on the memory, control is passed back to element 1508 via interface 1514. If the user is performing a read operation on the memory, control is passed to element 1510 via interface 1512. Element 1510 determines whether the read data word has an error therein. If the read data word does not have an error therein, control is passed back to element 1508 via interface 1514. If the read data word does have an error therein, control is passed to element 1516 via interface 1518. Element 1516 interrupts the execution of the program, temporarily. Control is then passed to element 1520 via interface 1522. Element 1520 determines whether the error is a soft error or a hard error. If the error is a hard error, control is passed to element 1524 via interface 1526. Element 1524 aborts the execution of the program. Referring back to element 1520, if the error is a soft error, control is passed to element 1528 via interface 1530. Element 1528 reloads the contents of the memory. Control is then passed to element 1532 via interface 1534. Element 1532 continues the execution of the program. Control is then passed back to element 1508 via interface 1514.

Figure 20:
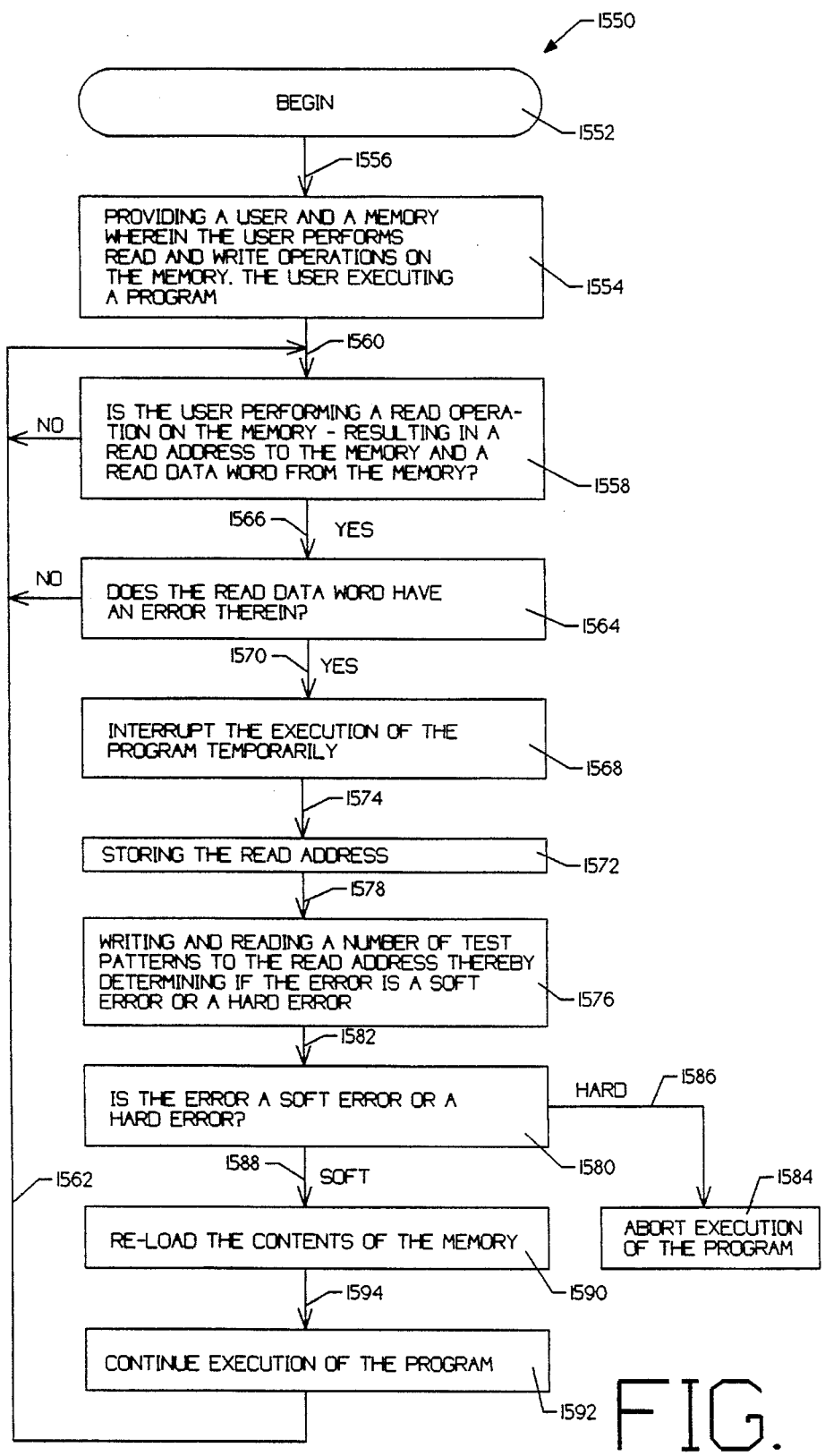
FIG. 20 is a flow diagram showing a fourth exemplary method of the present invention.

FIG. 20 is a flow diagram showing a fourth exemplary method of the present invention. The flow diagram is generally shown at 1550. The algorithm is entered at element 1552, wherein control is passed to element 1554 via interface 1556. Element 1554 provides a user and a memory, wherein the user performs a number of read and/or write operations on the memory while executing a program. Control is then passed to element 1558 via interface 1560. Element 1558 determines whether the user is performing a read operation on the memory, thereby resulting in a read address to the memory and a read data word from the memory. If the user is not performing a read operation on the memory, control is passed back to element 1558 via interface 1562. If the user is performing a read operation on the memory, control is passed to element 1564 via interface 1566. Element 1564 determines whether the read data word has an error therein. If the read data word does not have an error therein, control is passed back to element 1558 via interface 1562. If the read data word does have an error therein, control is passed to element 1568 via interface 1570. Element 1568 interrupts the execution of the program, temporarily. Control is then passed to element 1572 via interface 1574. Element 1572 stores the read address. Control is then passed to element 1576 via interface 1578. Element 1576 writes and reads a number of test patterns to the read address of the memory, thereby determining if the error is a soft error or a hard error. Control is then passed to element 1580 via interface 1582. Element 1580 determines whether the error is a soft error or a hard error. If the error is a hard error, control is passed to element 1584 via interface 1586. Element 1584 aborts the execution of the program. Referring back to element 1580, if the error is a soft error, control is passed to element 1590 via interface 1588. Element 1590 reloads the contents of the memory. Control is then passed to element 1592 via interface 1594. Element 1592 continues the execution of the program. Control is then passed back to element 1558 via interface 1562.

Having thus described the preferred embodiments of the present invention, those of skill in the art will readily appreciate that the teachings found herein may be applied to yet other embodiments within the scope of the claims hereto attached.

We claim:

1. In a computer system which executes a program, the computer system having a memory and a support controller, the memory having a number of address locations wherein the number of address locations are capable of storing a number of corresponding data elements, the computer system capable of performing a number of write operations to the memory and further capable of performing a number of read operation to the memory, the improvement comprising:
   a. detecting means coupled to the memory for detecting an error within a read data element wherein the read data element is read from a selected one of the number of address locations via one of the number of read operations;
   b. storing means coupled to said detecting means for storing the selected one of the number of address locations when said error is detected;
   c. interrupting means coupled to said detecting means and further coupled to the computer system for temporarily interrupting the execution of the program when said detecting means detects said error;
   d. testing means coupled to said detecting means for writing and reading a predetermined number of test patterns to the selected one of the number of address locations, thereby determining whether said error is a fatal error;
   e. reloading means coupled said testing means and further coupled to said interrupting means for reloading a correct copy of the read data element into the selected one of the number of address locations via the support controller if said error is not a fatal error;
   f. enabling means coupled to said testing means and further coupled to the computer system for enabling the computer system if said testing means determines that said error is not a fatal error; and
   g. aborting means coupled to said testing means for aborting the execution of the program if said testing means determines that said error is a fatal error.

2. A computer system according to claim 1 wherein said detecting means comprises a parity check block.

3. A computer system according to claim 1 wherein said interrupting means comprises a test block.

4. An apparatus according to claim 1 wherein said testing means writes and reads a predetermined number of test patterns to a number of address locations including the selected one of the number of address locations, thereby determining whether said error is a fatal error.

5. An apparatus according to claim 1 wherein said error is deemed fatal if said error is a hard error.

6. An apparatus according to claim 1 wherein said storing means stores the selected one of the number of address locations in a register.

7. A computer system having a number of users, a support controller, and a memory having a number of address locations, the number of users being coupled to the memory via an address bus and a data bus, at least one of the number of users providing a number of addresses to the memory via the address bus, the memory providing a number of corresponding read data words to the at least one of the number of users via the data bus, comprising:
   a. an error detect block coupled to the address bus and the data bus, said error detect block including:
      i. error detection means coupled to the data bus for detecting an error in the number of corresponding read data words; and ii. storing means coupled to said error detection means and further coupled to the address bus for storing a corresponding address when said error detecting means detects an error, said address corresponding to a memory location within the memory which provided said error;

b. a test block coupled to the address bus, the data bus, said error detect block, and the at least one of the number of users, said test block including:

i. interrupting means coupled to said detecting means and further coupled to the at least one of the number of users for temporarily interrupting the at least one of the number of users when said detecting means detects said error;

ii. testing means coupled to said storing means, said detecting means, and to the memory, said testing means writing and reading a number of test patterns to said corresponding address thereby determining if said error is a fatal error or a non-fatal error;

iii. reloading means coupled to said testing means for reloading a correct copy of said corresponding read data word to said corresponding address via the support controller if said testing means determines that said error is a non-fatal error;

iv. enabling means coupled to said testing means for enabling the at least one of the number of users if said testing means determines that said error is a fatal error; and v. aborting means coupled to said testing means for aborting the at least one of the number of users if said testing means determines that said error is a fatal error.

8. A computer system according to claim 7 wherein said error detection means comprises a parity check circuit.

9. A computer system according to claim 8 wherein said storing means comprises a memory address register.

10. A computer system according to claim 9 wherein said test means comprises a test pattern generator block.

11. An apparatus according to claim 7 wherein said testing means writes and reads a number of test patterns to a number of address locations including said corresponding address, thereby determining whether said error is a fatal error.

12. An apparatus according to claim 7 wherein said error is deemed fatal if said error is a hard error.

13. In a computer system which executes a program, the computer system having a memory and a support controller, the memory having a number of address locations wherein the number of address locations are capable of storing a number of corresponding data elements, the computer system capable of performing a number of write operations to the memory and further capable of performing a number of read operation to the memory, the improvement comprising:

a. a detecting circuit coupled to the memory for detecting an error within a read data element wherein the read data element is read from a selected one of the number of address location via one of the number of read operations;

b. a storing circuit coupled to said detecting circuit for storing the selected one of the number of address locations when said error is detected;

c. an interrupting circuit coupled to said detecting circuit and further coupled to the computer system for temporarily interrupting the execution of the program when said detecting circuit detects said error;

d. a testing circuit coupled to said detecting circuit for writing and reading a predetermined number of test patterns to the selected one of the number of address locations, thereby determining whether said error is a fatal error;

e. a reloading circuit coupled said testing circuit and further coupled to said interrupting circuit for reloading a correct copy of the read data element into the selected one of the number of address locations via the support controller, if said error is not a fatal error;

f. an enabling circuit coupled to said testing circuit and further coupled to the computer system for enabling the computer system if said testing circuit determines that said error is not a fatal error; and g. an aborting circuit coupled to said testing circuit for aborting the execution of the program if said testing circuit determines that said error is a fatal error.

14. A computer system according to claim 13 wherein said detecting circuit comprises a parity check block.

15. A computer system having a number of users, a support controller, and a memory having a number of address locations, the number of users being coupled to the memory via an address bus and a data bus, at least one of the number of users providing a number of addresses to the memory via the address bus, the memory providing a number of corresponding read data words to the at least one of the number of users via the data bus, comprising:

a. an error detect block coupled to the address bus and the data bus, said error detect block including:

i. an error detection circuit coupled to the data bus for detecting an error in the number of corresponding read data words; and ii. a storing circuit coupled to said error detection circuit and further coupled to the address bus for storing a corresponding address when said error detecting circuit detects an error, said address corresponding to a memory location within the memory which provided said error;

b. a test block coupled to the address bus, the data bus, said error detect block, and the at least one of the number of users, said test block including:

i. an interrupting circuit coupled to said detecting circuit and further coupled to the at least one of the number of users for temporarily interrupting the at least one of the number of users when said detecting circuit detects said error;

ii. a testing circuit coupled to said storing circuit, said detecting circuit, and to the memory, said testing circuit writing and reading a number of test patterns to said corresponding address thereby determining if said error is a fatal error or a non-fatal error;

iii. a reloading circuit coupled to said testing circuit for reloading a correct copy of said corresponding read data word to said corresponding address via the support controller if said testing circuit determines that said error is a non-fatal error;

iv. an enabling circuit coupled to said testing circuit for enabling the at least one of the number of users if said testing circuit determines that said error is a fatal error; and v. an aborting circuit coupled to said testing circuit for aborting the at least one of the number of users if said testing circuit determines that said error is a fatal error.

16. A computer system according to claim 15 wherein said error detection circuit comprises a parity check circuit.

17. A computer system according to claim 15 wherein said storing circuit comprises a memory address register.

18. A computer system according to claim 15 wherein said testing circuit comprises a test pattern generator block.

19. A method for performing error detection within a computer system wherein the computer system has a number of users, a support controller and a memory, the number of users being coupled to the memory via an address bus and a data bus, least one of the number of users executing a program therein, wherein the at least one of the number of users performing a number of read operations on the memory during the execution of the program via the address bus and the data bus, the method comprising the steps of:

a. determining if the at least one of the number of users is providing a read address to the memory via the address bus thereby performing a read operation on the memory, the memory providing a corresponding read data word to the at least one of the number of users via the data bus during said read operation;

b. determining if said corresponding read data word has an error therein;

c. interrupting the execution of the program in the at least one of the number of users, temporarily;

d. determining if said error is a fatal error or a non-fatal error;

e. aborting the execution of the program in the at least one of the number of users if said determining step (d) determines what said error is a fatal error; and f. reloading the contents of the memory via the support controller of said determining step (d) determines that said error is non-fatal error and allowing the at least one of the number of users to continue executing the program thereafter.

20. A method according to claim 19 wherein said determining step (d) further comprises:

a. writing and reading a number of test patterns to said corresponding address of the memory.

21. A method according to claim 19 wherein at least one of the number of users periodically reads a predetermined number of read addresses to determine if an error exists in the memory.

22. A method for performing error detection in a computer system wherein the computer system has a number of users and a memory, the number of users being coupled to the memory via an address bus and a data bus, at least one of the number of users executing a program therein, wherein the at least one of the number of users performing a number of read operations on the memory during the execution of the program via the address bus and the data bus, the method comprising the steps of:

a. determining if the at least one of the number of users is providing a read address to the memory via the address bus thereby performing a read operation on the memory, the memory providing a corresponding read data word to the at least one of the number of users via the data bus during said read operation;

b. determining if said corresponding read data word has an error therein;

c. interrupting the execution of the program in the at least one of the number of users, temporarily;

d. determining if said error is a fatal error or a non-fatal error;

e. aborting the execution of the program in the at least one of the number of users if said determining step (d) determines that said error is a fatal error; and f. reloading the contents of the memory if said determining step (d) determines that said error is a non-fatal error and allowing the at least one of the number of users to continue executing the program thereafter.

23. A method for performing error detection in a computer system wherein the computer system has a number of users, a support controller, and a memory and wherein the memory has a number of addresses, the number of users being coupled to the memory via an address bus and a data bus, at least one of the number of users executing a program therein, wherein the at least one of the number of users performing a number of read operations on the memory during the execution of the program via the address bus and the data bus, the method comprising the steps of:

a. determining if the at least one of the number of users is providing a read address to the memory via the address bus thereby performing a read operation on the memory, the memory providing a corresponding read data word to the at least one of the number of users via the data bus during said read operation;

b. determining if said corresponding read data word has an error therein by performing a parity check thereon;

c. interrupting the execution of the program in the at least one of the number of users, temporarily;

d. storing said read address thereby identifying the location of said error within the memory;

e. determining if said error is a fatal error or a non-fatal error by writing and reading a number of test patterns to said read address;

f. aborting the execution of the program in the at least one of the number of users if said determining step (e) determines that said error is a fatal error; and g. reloading the contents of said read address of the memory if said determining step (e) determines that said error is a non-fatal error, and allowing the at least one of the number of users to continue executing the program thereafter.

24. A method according to claim 23 wherein at least one of the number of users periodically reads a predetermined number of the number of addresses to determine if an error exists therein.

25. A method according to claim 23 wherein said reloading step (g) reloads a predetermined number of the number of addresses including the read address.

26. A data processing system having a memory module, the memory module having a number of address locations wherein a number of data elements are stored in the number of address locations, comprising:

a. storage means capable of storing a number of data elements;

b. interface means coupled to the memory module and further coupled to said storage means for providing an interface between the memory module and said storage means, said data processing system performing a transfer operation thereby transferring a selected number of the number of data elements between the memory and said storage means via said interface means;

c. error detecting means coupled to the memory for detecting an error within the number of data elements that are transferred between the memory and said storage means during said transfer operation;

d. capture means coupled to said error detecting means for capturing a corresponding one of the number of address locations which corresponds to the data element has said error therein;

e. interrupting means coupled to said error detecting means and further coupled to the data processing system for temporarily interrupting the execution of said transfer operation when said error detecting means detects said error;

f. testing means coupled to said error detecting means for writing and reading a predetermined number of test patterns to the corresponding one of the number of address locations captured by said capture means, thereby determining whether said error is a fatal error;

g. reloading means coupled said testing means and further coupled to said interrupting means for reloading a correct copy of the data element containing said error, into the corresponding one of the number of address locations captured by said capture means, if said error is not a fatal error;

h. enabling means coupled to said testing means and further coupled to the data processing system for enabling the transfer operation if said testing means determines that said error is not a fatal error; and i. aborting means coupled to said testing means for aborting the execution of the transfer operation if said testing means determines that said error is a fatal error.

27. A data processing system having a memory module, the memory module having a number of address locations wherein a number of data elements are stored in the number of address locations, comprising:

a. at least one primary power source coupled to the data processing system for providing power to the data processing system;

b. a detecting circuit coupled to said at least one primary power source for detecting a degradation in any of said at least one primary power source;

c. at least one secondary power source coupled to the data processing system and further coupled to said detecting circuit for providing power to the data processing system when said detecting circuit detects a degradation in any of said at least one primary power source;

d. at least one disk drive coupled to said at least one primary power source and further coupled to said at least one secondary power source, said at least one disk drive capable of storing a number of data elements;

e. interface means coupled to the memory module and further coupled to said at least one disk drive for providing an interface between the memory module and said at least one disk drive, said data processing system performing a downloading operation thereby downloading the number of data elements stored in the number of address locations in the memory to said at least one disk drive via said interface means, when said detecting circuit detects a degradation in any of said at least one primary power source;

f. error detecting means coupled to the memory for detecting an error within the number of data elements that are downloaded to said at least one disk drive during said downloading operation;

g. storing means coupled to said error detecting means for storing a corresponding one of the number of address locations which corresponds to the data element that has said error therein;

h. interrupting means coupled to said error detecting means and further coupled to the data processing system for temporarily interrupting the execution of the downloading operation when said error detecting means detects said error;

i. testing means coupled to said error detecting means for writing and reading a predetermined number of test patterns to the corresponding one of the number of address locations stored by said storing means, thereby determining whether said error is a fatal error;

j. reloading means coupled said testing means and further coupled to said interrupting means for reloading a correct copy of the data element containing said error into the corresponding one of the number of address locations stored by said storing means, if said error is not a fatal error;

k. enabling means coupled to said testing means and further coupled to the data processing system for enabling the downloading operation if said testing means determines that said error is not a fatal error; and l. aborting means coupled to said testing means for aborting the execution of the downloading operation if said testing means determines that said error is a fatal error.

* * * * *